United States Patent
Someya

(10) Patent No.: US 11,218,662 B2
(45) Date of Patent: Jan. 4, 2022

(54) IMAGE PROCESSING DEVICE, IMAGE PROCESSING METHOD, AND PROJECTION SYSTEM

(71) Applicant: SONY CORPORATION, Tokyo (JP)

(72) Inventor: Kiyoto Someya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/964,850

(22) PCT Filed: Jan. 25, 2019

(86) PCT No.: PCT/JP2019/002390
§ 371 (c)(1),
(2) Date: Jul. 24, 2020

(87) PCT Pub. No.: WO2019/155904
PCT Pub. Date: Aug. 15, 2019

(65) Prior Publication Data
US 2021/0067732 A1     Mar. 4, 2021

(30) Foreign Application Priority Data
Feb. 8, 2018  (JP) .............................. JP2018-020696

(51) Int. Cl.
*H04N 5/74*    (2006.01)
*G09G 5/36*    (2006.01)
*H04N 9/31*    (2006.01)

(52) U.S. Cl.
CPC ................. *H04N 5/74* (2013.01); *G09G 5/36* (2013.01); *H04N 9/3185* (2013.01)

(58) Field of Classification Search
None
See application file for complete search history.

(56) References Cited

U.S. PATENT DOCUMENTS 6,141,034 A * 10/2000 McCutchen ....... H04N 5/23238
                                            348/36
6,222,593 B1 * 4/2001 Higurashi .............. G03B 37/04
                                          315/368.12

(Continued)

FOREIGN PATENT DOCUMENTS

JP    2005-244835 A    9/2005
JP    2012-249009 A    12/2012

(Continued)

OTHER PUBLICATIONS

International Search Report and Written Opinion of PCT Application No. PCT/JP2019/002390, dated Apr. 2, 2019, 08 pages of ISRWO.

*Primary Examiner* — John W Miller
*Assistant Examiner* — Sean N. Haiem
(74) *Attorney, Agent, or Firm* — Chip Law Group

(57) ABSTRACT

The present technology relates to an image processing device, an image processing method, a program, and a projection system that facilitate the adjustment of the position and tilt of a camera. An image processing device according to one aspect of the present technology estimates, on the basis of a taken image taken by a camera installed at a predetermined tilt, the tilt of the camera, the camera being configured to photograph a projection surface of a screen on which a pattern image that is an image having a predetermined pattern has been projected from a projector, and performs control to display the taken image rotated depending on the tilt of the camera. The present technology is applicable to computers configured to control a plurality of projectors to project video.

12 Claims, 27 Drawing Sheets

(56) References Cited

U.S. PATENT DOCUMENTS

| | | | |
|---|---|---|---|
| 6,333,826 B1* | 12/2001 | Charles | G02B 13/06 359/725 |
| 2002/0024640 A1* | 2/2002 | Ioka | H04N 9/3147 353/94 |
| 2003/0142883 A1* | 7/2003 | Ishii | G06T 7/70 382/284 |
| 2010/0001997 A1* | 1/2010 | Kajikawa | G06T 15/20 345/419 |
| 2010/0073468 A1* | 3/2010 | Kutner | E04H 3/22 348/61 |
| 2010/0141780 A1* | 6/2010 | Tan | H04N 9/3185 348/222.1 |
| 2011/0211175 A1* | 9/2011 | Stehle | G02B 17/0652 353/98 |
| 2011/0254916 A1* | 10/2011 | Fan | G03B 35/18 348/41 |
| 2012/0194652 A1* | 8/2012 | Myokan | G06T 7/85 348/50 |
| 2012/0320042 A1* | 12/2012 | Green | H04N 9/3194 345/419 |
| 2013/0070094 A1* | 3/2013 | Majumder | G03B 37/04 348/143 |
| 2013/0314388 A1* | 11/2013 | Oda | G03B 21/53 345/207 |
| 2014/0300687 A1* | 10/2014 | Gillard | H04N 5/2628 348/36 |
| 2019/0075269 A1* | 3/2019 | Nashida | H04N 21/41 |
| 2019/0289285 A1* | 9/2019 | Nashida | H04N 13/366 |

FOREIGN PATENT DOCUMENTS

| | | |
|---|---|---|
| JP | 2014-003586 A | 1/2014 |
| JP | 2014-238601 A | 12/2014 |
| WO | 2005/084017 A1 | 9/2005 |

* cited by examiner

FIG.9
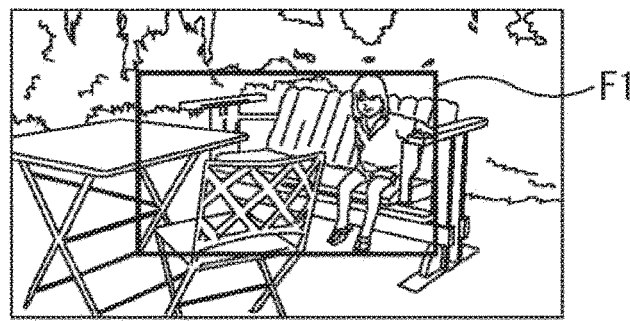
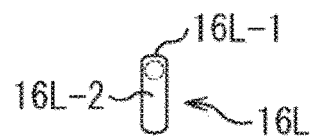
90-DEGREE HORIZONTAL POSITION
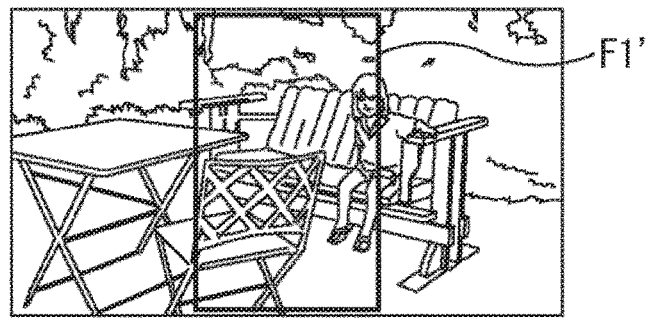
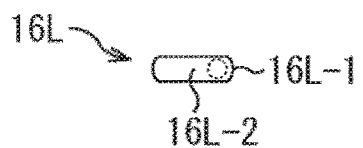

FIG.11
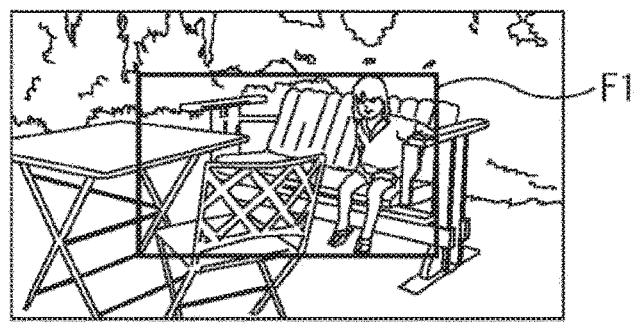
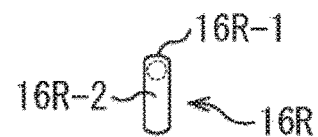
90-DEGREE HORIZONTAL POSITION
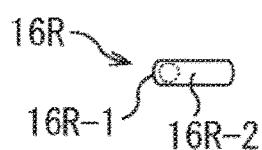

FIG. 19
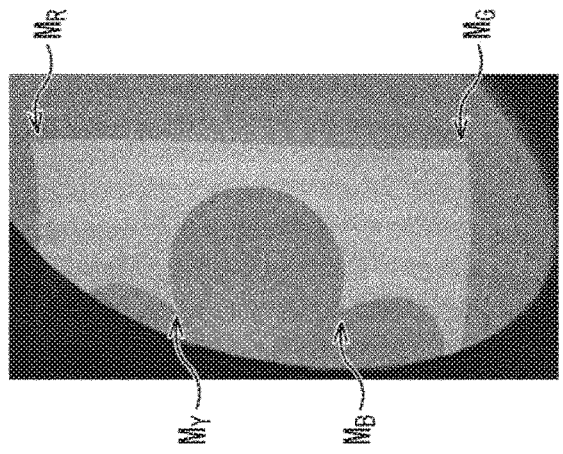
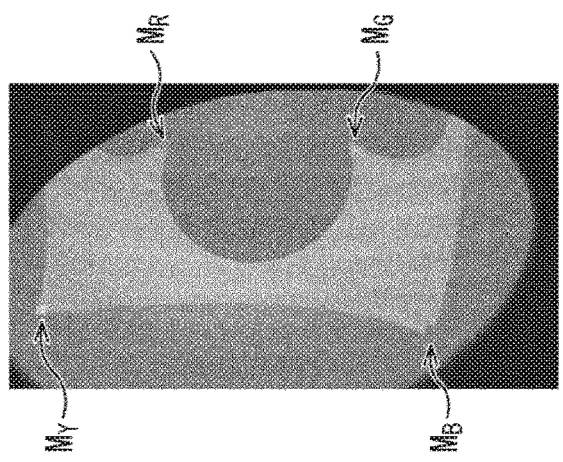

FIG. 23
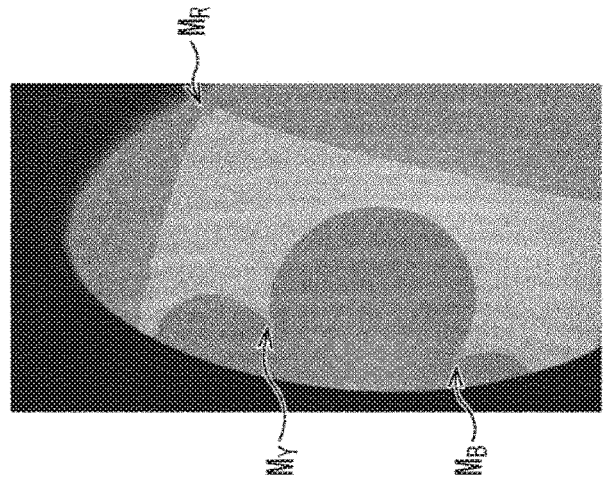
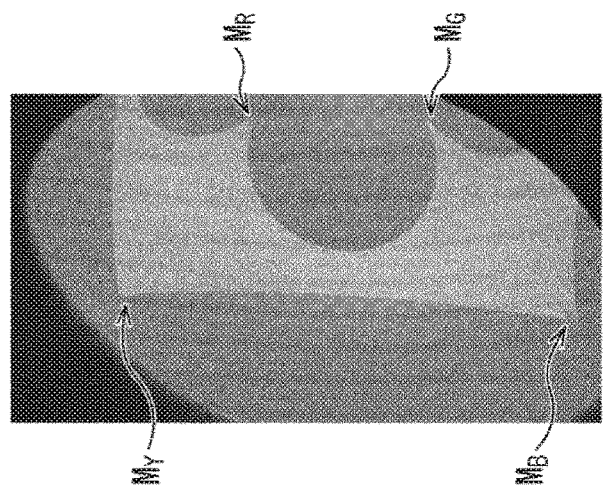

FIG. 24
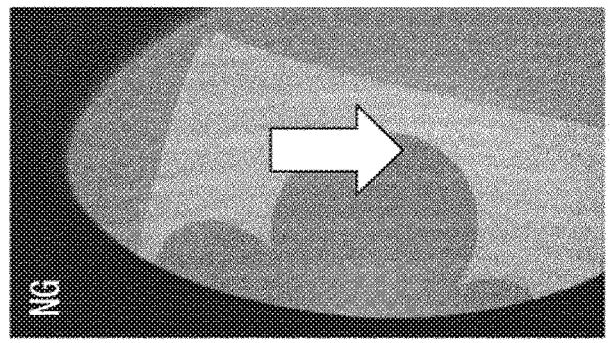
CAMERA 16L TAKEN IMAGE (L)
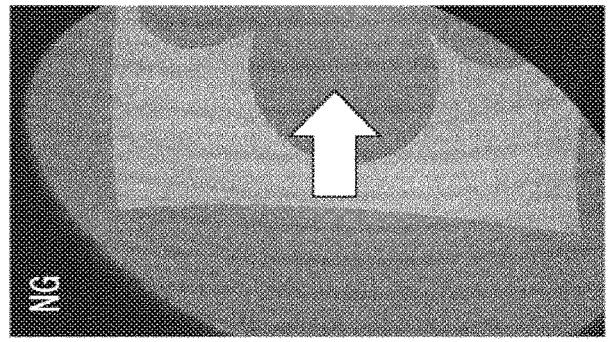
CAMERA 16R TAKEN IMAGE (R)

F I G . 2 5
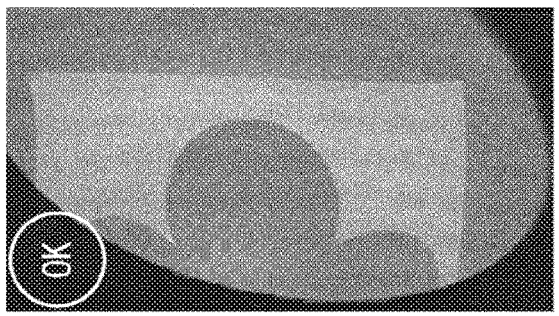
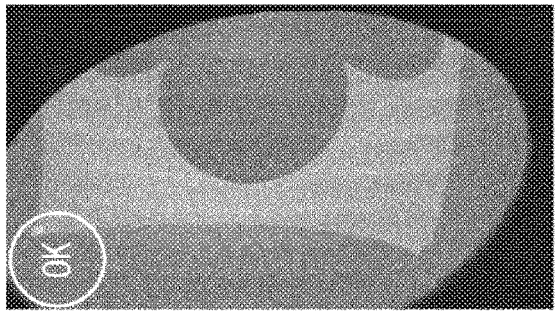

IMAGE PROCESSING DEVICE, IMAGE PROCESSING METHOD, AND PROJECTION SYSTEM

CROSS REFERENCE TO RELATED APPLICATIONS

This application is a U.S. National Phase of International Patent Application No. PCT/JP2019/002390 filed on Jan. 25, 2019, which claims priority benefit of Japanese Patent Application No. JP 2018-020696 filed in the Japan Patent Office on Feb. 8, 2018. Each of the above-referenced applications is hereby incorporated herein by reference in its entirety.

TECHNICAL FIELD

The present technology relates to an image processing device, an image processing method, a program, and a projection system, and in particular, to an image processing device, an image processing method, a program, and a projection system that facilitate the adjustment of the position and tilt of a camera.

BACKGROUND ART

An image projected on a screen with the use of a projector looks distorted depending on the shape of the screen and the orientation of the projector.

As a typical distortion, there is a phenomenon in which an image projected by a projector installed at an elevation or depression angle with respect to a screen is distorted to be a trapezoid. To make an image distorted to be a trapezoid look like a correct shape, keystone correction is necessary.

CITATION LIST

Patent Literature

[PTL 1]
Japanese Patent Laid-open No. 2014-238601

SUMMARY

Technical Problems

In a case where images are projected with the use of a plurality of projectors, there are various installation conditions.

For example, it is necessary to match images in an overlapping region in which projection light beams from the plurality of projectors overlap each other, and match the brightness of the overlapping region with the brightness of the surroundings. Correction for matching images in an overlapping region is called warping (geometric correction), and correction for making brightness uniform is called blending (optical correction).

Further, in a case where images are projected on a dome screen, since the screen is not flat, correct images may not be projected without geometric correction. As a method of preparing parameters for geometric correction, there is a method that includes installing a measurement camera at a predetermined position and analyzing a taken image.

The present technology has been made in view of such circumstances, and facilitates the adjustment of the position and tilt of a camera.

Solution to Problems

According to one aspect of the present technology, there is provided an image processing device including an estimation unit configured to estimate, on the basis of a taken image taken by a camera installed at a predetermined tilt, the tilt of the camera, the camera being configured to photograph a projection surface of a screen on which a pattern image that includes an image having a predetermined pattern has been projected from a projector, and a display controlling unit configured to perform control to display the taken image rotated depending on the tilt of the camera.

In one aspect of the present technology, on the basis of a taken image taken by the camera installed at a predetermined tilt, the tilt of the camera is estimated, the camera being configured to photograph the projection surface of the screen on which a pattern image that includes an image having a predetermined pattern has been projected from the projector, and the taken image rotated depending on the tilt of the camera is displayed.

Advantageous Effect of Invention

According to the present technology, it is possible to easily adjust the position and tilt of the camera.

Note that, the effect described herein is not necessarily limited and may be any effect described in the present disclosure.

BRIEF DESCRIPTION OF DRAWINGS

FIG. 9 is a diagram illustrating an example of the angle of view of the camera.

FIG. 11 is a diagram illustrating another example of the angle of view of the camera.

FIG. 19 is a diagram illustrating examples of preview images.

FIG. 23 is a diagram illustrating examples of the preview images.

FIG. 24 is a diagram illustrating a display example of guide information.

FIG. 25 is a diagram illustrating another display example of the guide information.

DESCRIPTION OF EMBODIMENT

Now, a mode for embodying the present technology is described. The description is made in the following order.

1. Configuration of Multi-Projection System
2. Arrangement Example of Projector and Camera
3. Example of Angle of View of Camera
4. Example of Projection Image
5. Global Adjustment
6. Detailed Adjustment
7. Configuration of Image Processing Device
8. Operation of Image Processing Device
9. Modified Example <Configuration of Multi-Projection System>

Figure 1:
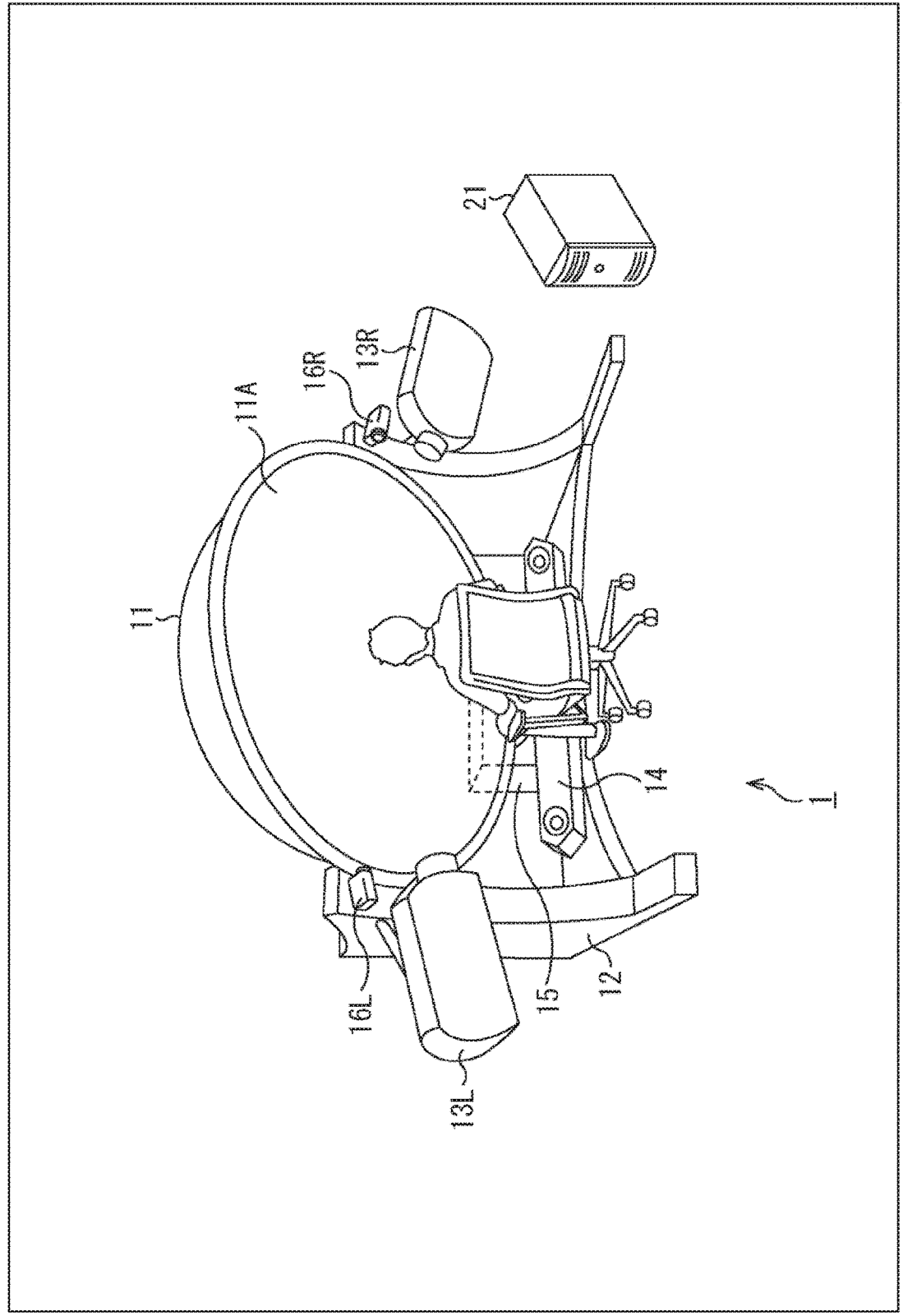
FIG. 1 is a diagram illustrating a configuration example of a multi-projection system.

FIG. 1 is a diagram illustrating a configuration example of a multi-projection system according to one embodiment of the present technology.

A multi-projection system 1 of FIG. 1 includes a dome screen 11 mounted on an installation stand 12. The dome screen 11 has a dome (hemisphere) projection surface 11A with a diameter of approximately 2 m. The dome screen 11 is mounted at a height of approximately 1 m with its opening facing downward.

As illustrated in FIG. 1, a chair is prepared in front of the dome screen 11. A user sits on the chair to watch content projected on the projection surface 11A.

Further, the multi-projection system 1 includes projectors 13L and 13R, a surround speaker 14, a woofer 15, cameras 16L and 16R, and an image processing device 21. The projectors 13L and 13R, the surround speaker 14, the woofer 15, and the cameras 16L and 16R are connected to the image processing device 21 via wired or wireless communication.

The projectors 13L and 13R are mounted on the left and right of the dome screen 11 with their projection units facing the dome screen 11. For example, the projectors 13L and 13R are fixed to the installation stand 12 with metallic members.

The cameras 16L and 16R are also mounted on the left and right of the dome screen 11 with their lenses facing the dome screen 11. For example, the cameras 16L and 16R are mounted on the edge of the dome screen 11 through predetermined members such that the positions and tilts of the cameras are adjustable. An administrator of the multi-projection system 1 can adjust the photography ranges by moving the cabinets of the cameras 16L and 16R with his/her hands. Instead of being mounted on the edge of the dome screen 11, the cameras 16L and 16R may be mounted on the installation stand 12 with the use of predetermined members.

Figure 2:
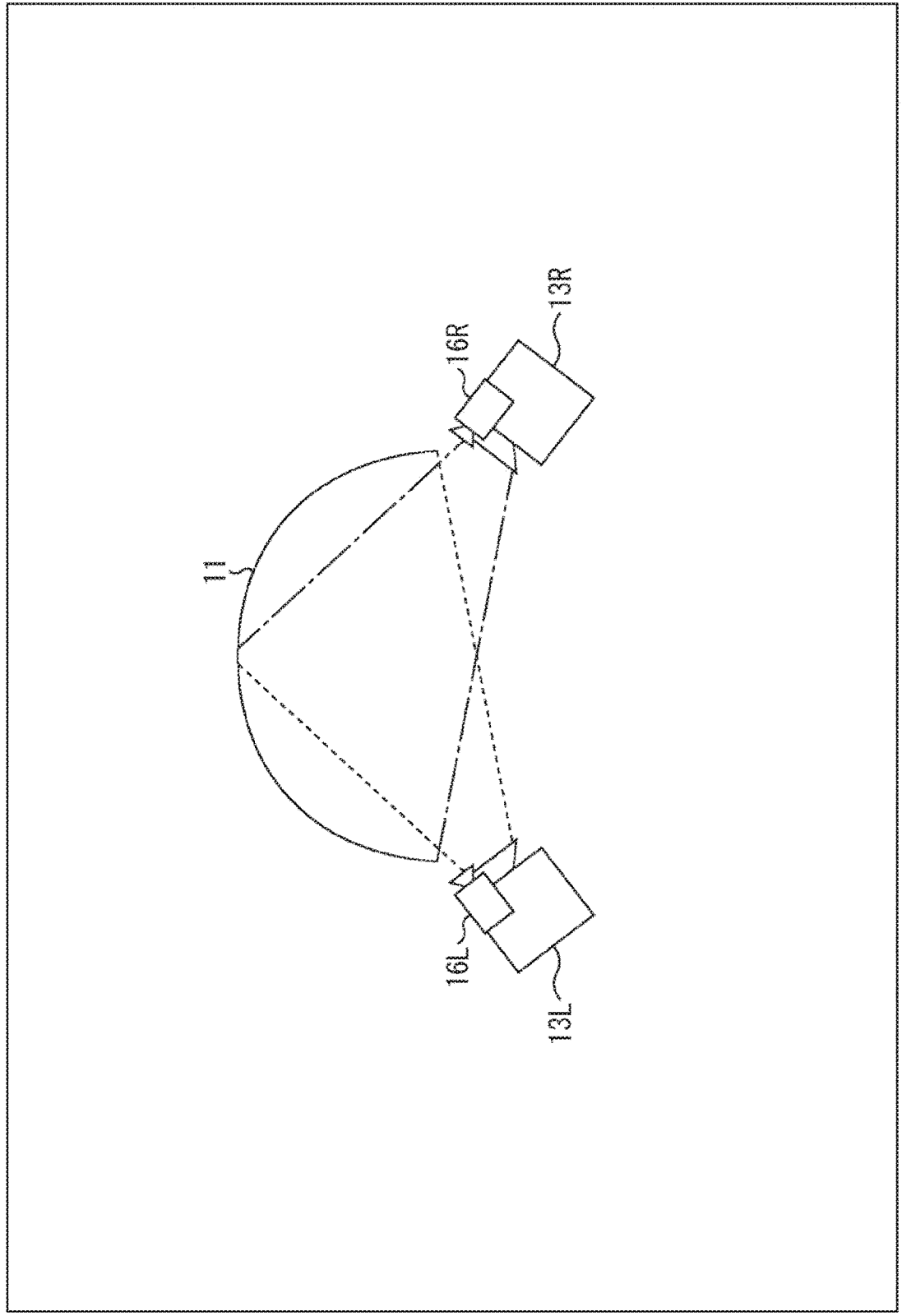
FIG. 2 is a diagram illustrating an example in which a positional relationship between projectors and cameras is viewed from the above.

FIG. 2 is a diagram illustrating an example in which the positional relationship between the projectors and the cameras is viewed from the above.

As illustrated in FIG. 2, the projector 13L is mounted at a position at which the projector 13L can project images in the substantially right half region of the dome screen 11. The projector 13R is mounted at a position at which the projector 13R can project images in the substantially left half region of the dome screen 11. The projection units of the projectors 13L and 13R each include a wide-angle lens such as a fisheye lens.

In FIG. 2, a range indicated by the broken line represents the projection range of the projector 13L, and a range indicated by the dashed-and-dotted line represents the projection range of the projector 13R. The details of the projection ranges are described later.

The projectors 13L and 13R project images assigned thereto to display a content image on the entire projection surface 11A, to thereby present the content image to the user. An image from each projector is generated on the basis of a content image such that one image can be watched with no distortion from the point of view of the user. When content is reproduced, images assigned to the respective projectors 13L and 13R are supplied from the image processing device 21.

As illustrated in FIG. 2, the camera 16L is provided near the projection unit of the projector 13L and the edge portion of the dome screen 11. Further, the camera 16R is provided near the projection unit of the projector 13R and the edge portion of the dome screen 11.

The camera 16L is used to photograph the projection surface 11A on which images have been projected from the projector 13L and the projector 13R.

On the basis of an image taken by the camera 16L, for example, a preview image is generated in the image processing device 21 to be displayed on a display connected to the image processing device 21. The preview image is an image that is displayed in the adjustment of the position and tilt of the camera 16L and represents the state of the projection surface 11A.

The camera 16R is used to photograph the projection surface 11A on which images have been projected from the projector 13L and the projector 13R.

On the basis of an image taken by the camera 16R, for example, a preview image is generated in the image processing device 21 to be displayed on the display connected to the image processing device 21. The preview image is an image that is displayed in the adjustment of the position and tilt of the camera 16R and represents the state of the projection surface 11A.

The user adjusts the positions and tilts of the cameras 16L and 16R while watching preview images at a predetermined timing such as when the multi-projection system 1 is installed.

An image taken by the adjusted camera 16L the position and tilt of which have been adjusted is used to generate parameters that are used in geometric correction for an image to be projected from the projector 13L, for example. Further, an image taken by the adjusted camera 16R is used to generate parameters that are used in geometric correction for an image to be projected from the projector 13R, for example.

Now, in a case where there is no need to distinguish between the projector 13L and the projector 13R, the projector 13L and the projector 13R are collectively referred to as a "projector 13" appropriately. Further, in a case where there is no need to distinguish between the camera 16L and the camera 16R, the camera 16L and the camera 16R are collectively referred to as a "camera 16."

Returning to the description of FIG. 1, the surround speaker 14 and the woofer 15 provided under the dome screen 11 output the sound of content reproduced by the image processing device 21.

The image processing device 21 reproduces content and generates, on the basis of each frame of the moving image of the content, a projection image that is projected from the projector 13. The image processing device 21 outputs the projection image to the projector 13 and controls the projector 13 to project the projection image on the projection surface 11A.

Further, the image processing device 21 outputs sound data obtained by reproducing content to the surround speaker 14 and the woofer 15 and controls the surround speaker 14 and the woofer 15 to output the sound of the content.

The image processing device 21 is, for example, a PC. The image processing device 21 may not be one PC but include a plurality of PCs. Further, the image processing device 21 may not be provided near the dome screen 11 as illustrated in FIG. 1 but may be provided in a room different from a room in which the dome screen 11 has been installed.

Note that, the two projectors are provided in the example of FIG. 1, but one projector may be provided or three or more projectors may be provided. The number of projectors that are provided in the multi-projection system 1 is optional.

Figure 3:
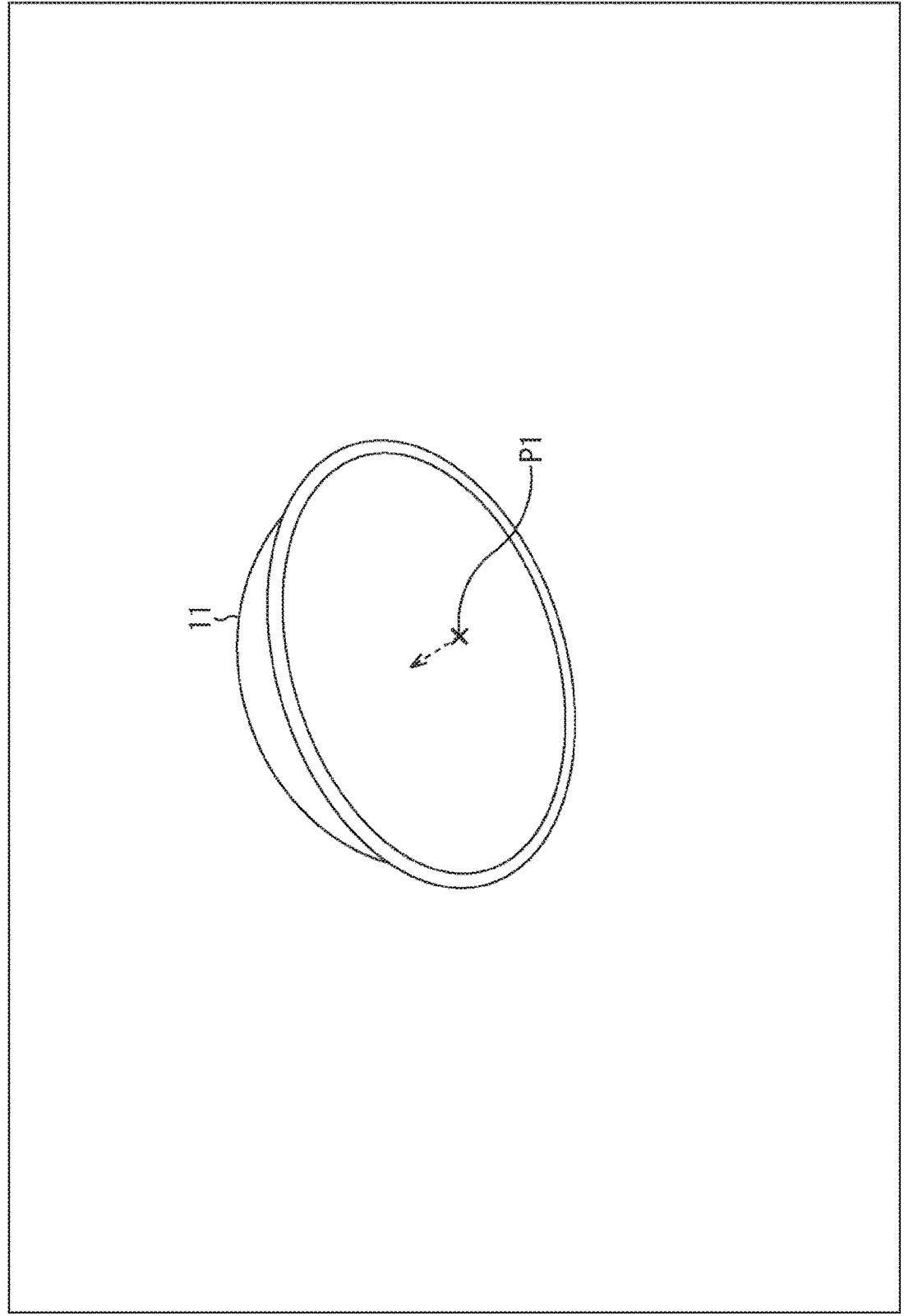
FIG. 3 is a diagram illustrating an example of a viewpoint position.

FIG. 3 is a diagram illustrating an example of a viewpoint position.

The user sitting on the chair in front of the dome screen 11 looks up a little as indicated by the broken line to watch images projected on the projection surface 11A with the viewpoint position being a position P1 in the vicinity of the center of the sphere of the projection surface 11A that is a sphere surface. The position of the innermost part of the projection surface 11A (dome zenith), which is indicated by the broken line arrow of FIG. 3, is the center position of the projection surface 11A.

Figure 4:
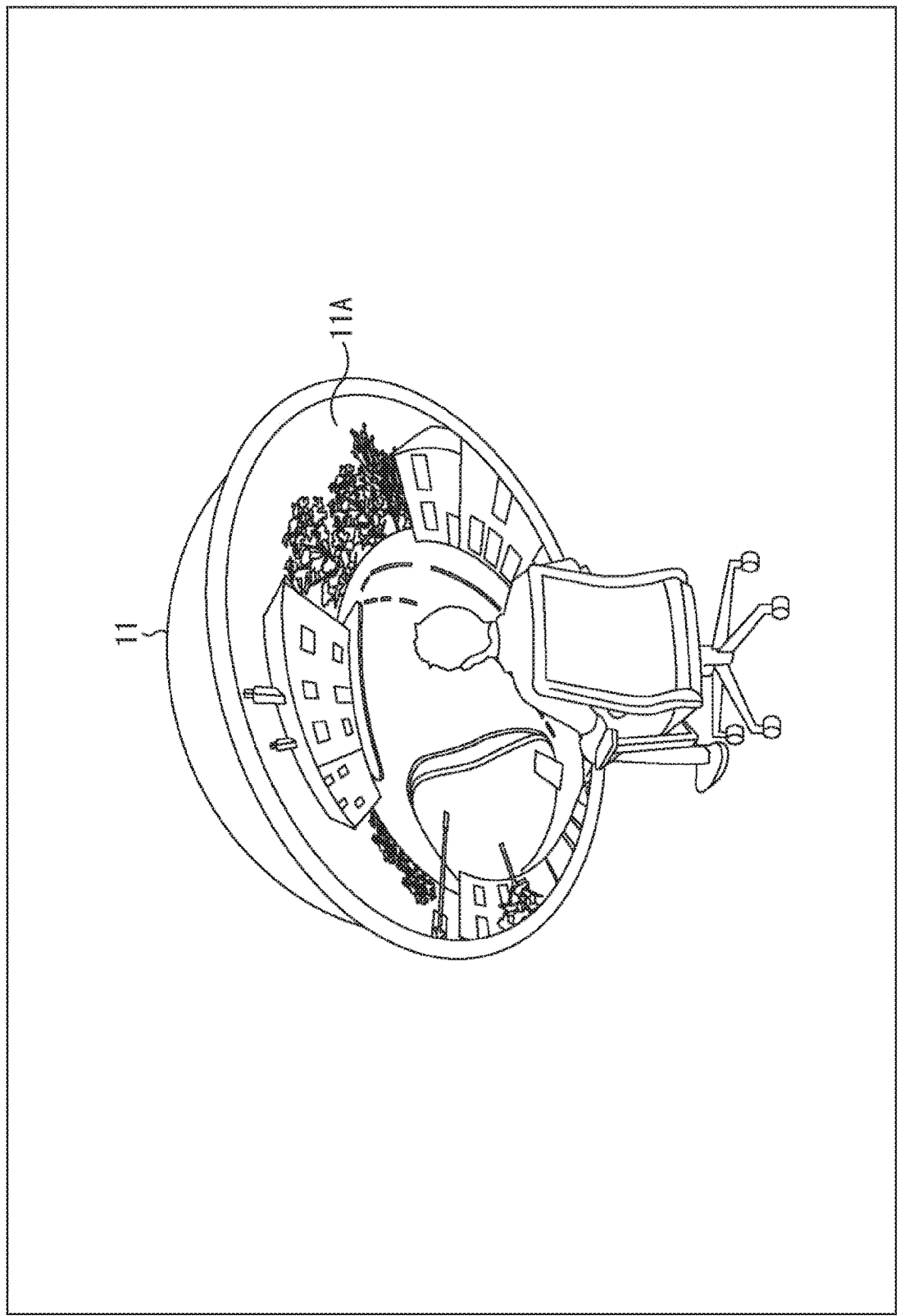
FIG. 4 is a diagram illustrating a projected state.

FIG. 4 is a diagram illustrating a projected state.

As illustrated in FIG. 4, when the user looks up to watch a projection image with the viewpoint position being the position P1, the field of view of the user is almost covered by the image projected on the projection surface 11A. Since almost the entire field of view is covered by the image, the user has an impression as if he/she was surrounded by the image, thereby being capable of feeling more realistic and immersed at the content.

For example, moving image content including entire celestial sphere images is provided. Other moving image content such as movies, television programs, and games, and still image content such as landscape photographs may be provided.

<Arrangement Example of Projector and Camera>

In such a way, in the multi-projection system 1, high-resolution and wide-viewing-angle images can be projected with the use of the plurality of projectors each of which includes the fisheye lens as the lens of the projection unit.

The projector 13L and the projector 13R are, for example, projectors capable of projecting 4K images such as 3840× 2160 pixel images.

Figure 5:
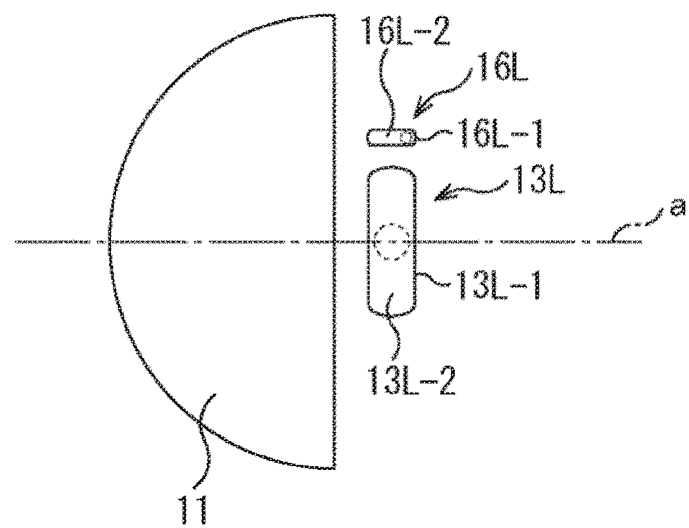
FIG. 5 is a diagram illustrating an example of how the projector and the camera are installed.

FIG. 5 is a diagram illustrating an example of how the projector 13L and the camera 16L are installed.

In the example of FIG. 5, the positional relationship between the dome screen 11, the projector 13L, and the camera 16L when the multi-projection system 1 is viewed from the left is schematically illustrated.

As described above, the dome screen 11 is mounted downward at a predetermined angle. In FIG. 5, however, for the purpose of illustration, the dome screen 11 is illustrated as being horizontal. An axis a connecting the center of the sphere of the projection surface 11A that is a sphere surface (position P1) to the zenith of the projection surface 11A is illustrated as a horizontal axis. The axis is similarly illustrated in FIG. 7.

In the case where the multi-projection system 1 is viewed from the left, as illustrated in FIG. 5, the projector 13L has an upper surface 13L-1 facing the user and a back surface 13L-2 appearing on the drawing sheet (being oriented into the plane of the drawing sheet). The projector 13L includes a substantially flat box-shaped cabinet.

Figure 6:
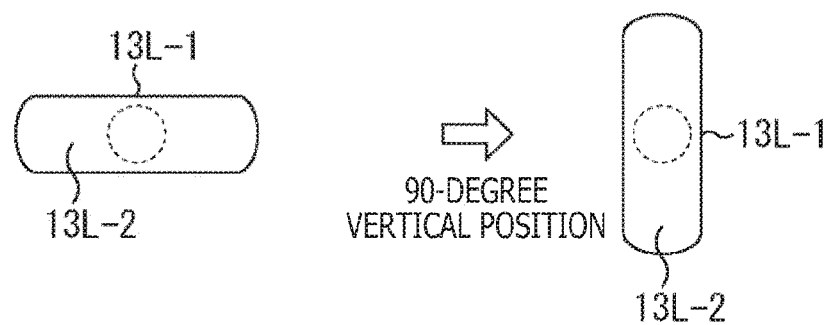
FIG. 6 is a diagram illustrating an example of the tilt of the projector.

Specifically, as illustrated in FIG. 6, the projector 13L is mounted at a 90-degree vertical position with the direction of the axis a being a reference. The projector 13L is a projector capable of projecting an image having an aspect ratio of, for example, 16:9 in a normal orientation (the upper side faces upward and the lower side faces downward) when having the upper surface 13L-1 facing upward as illustrated in the left part of FIG. 6.

With the projector 13L mounted at the 90-degree vertical position, the horizontal direction of an image projected from the projector 13L corresponds to the vertical direction of FIG. 5.

As indicated by the broken line circle, the projection unit of the projector 13L is provided on the cabinet front surface that is the other side of the back surface 13L-2. The bottom surface, left-side surface, and right-side surface of the cabinet face the dome screen 11, downward, and upward, respectively, in FIG. 5.

In the case where the multi-projection system 1 is viewed from the left, similarly, the camera 16L has an upper surface 16L-1 facing the user and a back surface 16L-2 appearing on the drawing sheet. In the example of FIG. 5, the shape of the back surface 16L-2 of the camera 16L is a vertically long substantially rounded rectangular shape.

The horizontal direction of an image taken by the camera 16L mounted with the upper surface facing the user similarly to the projector 13L corresponds to the vertical direction of FIG. 5.

Figure 7:
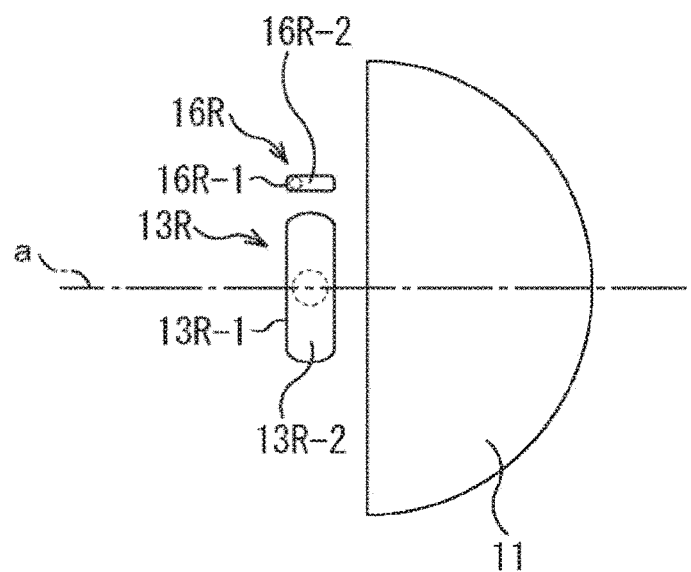
FIG. 7 is a diagram illustrating another example of how the projector and the camera are installed.

FIG. 7 is a diagram illustrating an example of how the projector 13R and the camera 16R are installed.

In the example of FIG. 7, the positional relationship between the dome screen 11, the projector 13R, and the camera 16R when the multi-projection system 1 is viewed from the right is schematically illustrated.

In the case where the multi-projection system 1 is viewed from the right, as illustrated in FIG. 7, the projector 13R has an upper surface 13R-1 facing the user and a back surface 13R-2 appearing on the drawing sheet. The projector 13R also includes a substantially flat box-shaped cabinet.

Figure 8:
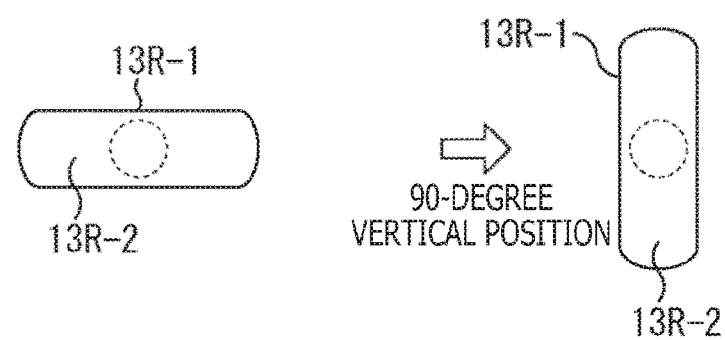
FIG. 8 is a diagram illustrating another example of the tilt of the projector.

Specifically, as illustrated in FIG. 8, the projector 13R is mounted at a 90-degree vertical position with the direction of the axis a being a reference. The projector 13R is a projector capable of projecting an image having an aspect ratio of, for example, 16:9 in the normal orientation when having the upper surface 13R-1 facing upward as illustrated in the left part of FIG. 8.

With the projector 13R mounted at the 90-degree vertical position, the horizontal direction of an image projected from the projector 13R corresponds to the vertical direction of FIG. 7.

As indicated by the broken line circle, the projection unit of the projector 13R is provided on the cabinet front surface that is the other side of the back surface 13L-2. The bottom surface, left-side surface, and right-side surface of the cabinet face the dome screen 11, upward, and downward, respectively, in FIG. 7.

In the case where the multi-projection system 1 is viewed from the right, similarly, the camera 16R has an upper surface 16R-1 facing the user and a back surface 16R-2 appearing on the drawing sheet. In the example of FIG. 7, the shape of the back surface 16L-2 of the camera 16R is a vertically long substantially rounded rectangular shape.

The horizontal direction of an image taken by the camera 16R mounted with the upper surface facing the user similarly to the projector 13R corresponds to the vertical direction of FIG. 7.

In such a way, the projector 13L and the projector 13R are vertically mounted by being rotated by 90°.

In general, with regard to the angle of view (resolution) of video display equipment such as a projector and a TV, the horizontal resolution is higher than the vertical resolution. The two projectors are installed on the left and right of the dome screen 11 such that the direction with a higher resolution, namely, the horizontal direction corresponds to the vertical direction of the dome screen 11, with the result that high resolution images can be projected on the entire projection surface 11A.

Further, the camera 16L and the camera 16R are mounted at positions at which the cameras do not disturb the user watching content and the cameras can permanently be installed.

As described above, the camera 16L and the camera 16R are used to photograph the projection surface 11A to measure the states of images projected on the projection surface 11A. From the viewpoint of the measurement accuracy, the camera 16L and the camera 16R are preferably installed as close as possible to the dome screen 11. It can be said that the positions of the camera 16L and the camera 16R are positions that satisfy such conditions.

As described with reference to FIG. 5 and FIG. 6, since the projector 13L is vertically mounted by being rotated to the right (clockwise direction) by 90° in a case of being viewed from the back surface, for example, the camera 16L is similarly mounted by being rotated to the right by 90°.

Further, as described with reference to FIG. 7 and FIG. 8, since the projector 13R is vertically mounted by being rotated to the left (counterclockwise direction) by 90° in a case of being viewed from the back surface, for example, the camera 16R is similarly mounted by being rotated to the left by 90°.

Similarly, with regard to the angle of views of the cameras 16L and 16R, the horizontal resolution is higher than the vertical resolution. With the camera 16L adjusted to the same tilt as the projector 13L and the camera 16R adjusted to the same tilt as the projector 13R, a wide range including images projected from the projectors 13L and 13R can be included in the angle of views to be photographed.

<Example of Angle of View of Camera>

FIG. 9 is a diagram illustrating an example of the angle of view of the camera 16L.

Here, the angle of view in a case where a certain landscape is photographed is described, but practically, a range including the projection surface 11 is photographed by the camera 16L. The range is similarly photographed in FIG. 11.

As illustrated in the upper part of FIG. 9, in a case where the camera 16L is installed in a normal orientation in front of a certain landscape (in a case where the upper surface 16L-1 faces upward and the front surface faces an object), the horizontally long rectangular range of the entire object, which is surrounded by a frame F1, is photographed.

In FIG. 9, the small broken line circle illustrated at a position near the upper surface 16L-1 on the back surface 16L-2 represents the lens provided on the front surface of the camera 16L.

Figure 10:
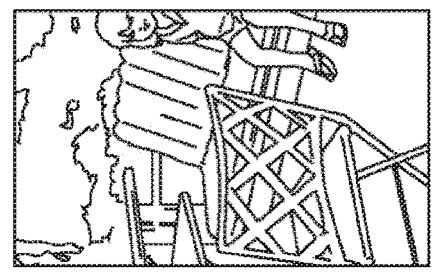
FIG. 10 is a diagram illustrating an example of a preview image.

Meanwhile, as illustrated in the lower part of FIG. 9, in a case where the camera 16 is horizontally installed by being rotated to the right by 90°, the vertically long rectangular range of the entire object, which is surrounded by a frame F1', is photographed. In such a case, on an adjustment screen, as illustrated in FIG. 10, there is displayed a preview image in which the right side of FIG. 9 corresponds to the upper side and the left side of FIG. 9 corresponds to the lower side. The adjustment screen is a screen that is used in the adjustment of the position and tilt of the camera 16.

The user adjusts the position and tilt of the camera 16L while watching a preview image, but in a case where a preview image in the orientation illustrated in FIG. 10 is displayed, the orientation of the preview image is different from the orientation of the object in the real space.

FIG. 11 is a diagram illustrating an example of the angle of view of the camera 16R.

As illustrated in the upper part of FIG. 11, in a case where the camera 16R is installed in a normal orientation in front of the certain landscape (in a case where the upper surface 16R-1 faces upward and the front surface faces the object), the horizontally long rectangular range of the entire object, which is surrounded by the frame F1, is photographed.

In FIG. 11, the small broken line circle illustrated at a position near the upper surface 16R-1 on the back surface 16R-2 represents the lens provided on the front surface of the camera 16R.

Meanwhile, as illustrated in the lower part of FIG. 11, in a case where the camera 16 is horizontally installed by being rotated to the left by 90°, the vertically long rectangular range of the entire object, which is surrounded by the frame F1', is photographed. In such a case, on the adjustment screen, as illustrated in FIG. 12, there is displayed a preview image in which the left side of FIG. 11 corresponds to the upper side and the right side of FIG. 11 corresponds to the lower side.

Figure 12:
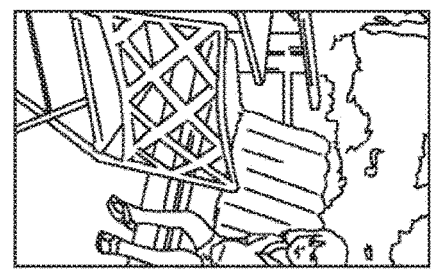
FIG. 12 is a diagram illustrating another example of the preview image.

The user adjusts the position and tilt of the camera 16R while watching a preview image, but in a case where a preview image in the orientation illustrated in FIG. 12 is displayed, the orientation of the preview image is different from the orientation of the object in the real space.

To match the orientations of preview images with an orientation in the real space, in the image processing device 21, the processing of rotating taken images depending on the tilts of the cameras 16L and 16R is performed.

Figure 13:
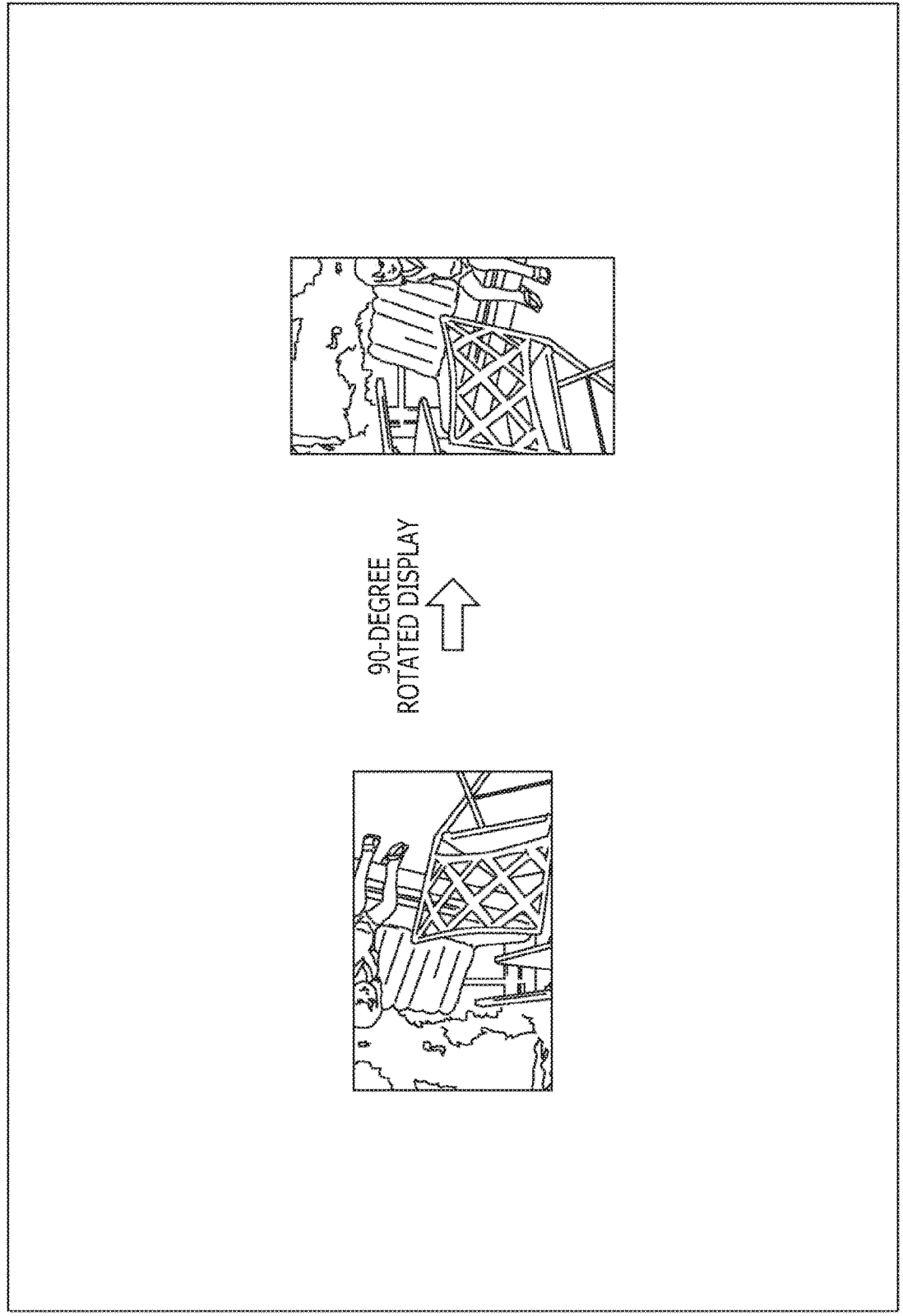
FIG. 13 is a diagram illustrating an example of how the image taken by the camera is rotated.

FIG. 13 is a diagram illustrating an example of how the image taken by the camera 16L is rotated.

The image illustrated in the left part of FIG. 13 is an image taken in the case where the camera 16L is horizontally installed as described with reference to FIG. 10. In a case where such an image is taken by the camera 16L, in the image processing device 21, the processing of rotating the image to the right by 90° is performed as indicated by the outline arrow, and the rotated image is displayed as a preview image. The tilt of the camera 16L is estimated on the basis of, for example, the taken image.

The display range of the preview image in the right part of FIG. 13 is switched to the right range when the camera 16L horizontally installed as illustrated in the lower part of FIG. 9 is moved to the right in the real space, and the display range of the preview image is switched to the left range when the camera 16L is moved to the left. Even in the case where the camera 16L is horizontally installed, the movement direction of the camera 16L in the real space matches the switching direction of a display range, and hence, the user can intuitively adjust the position and tilt of the camera 16L while watching a preview image.

Figure 14:
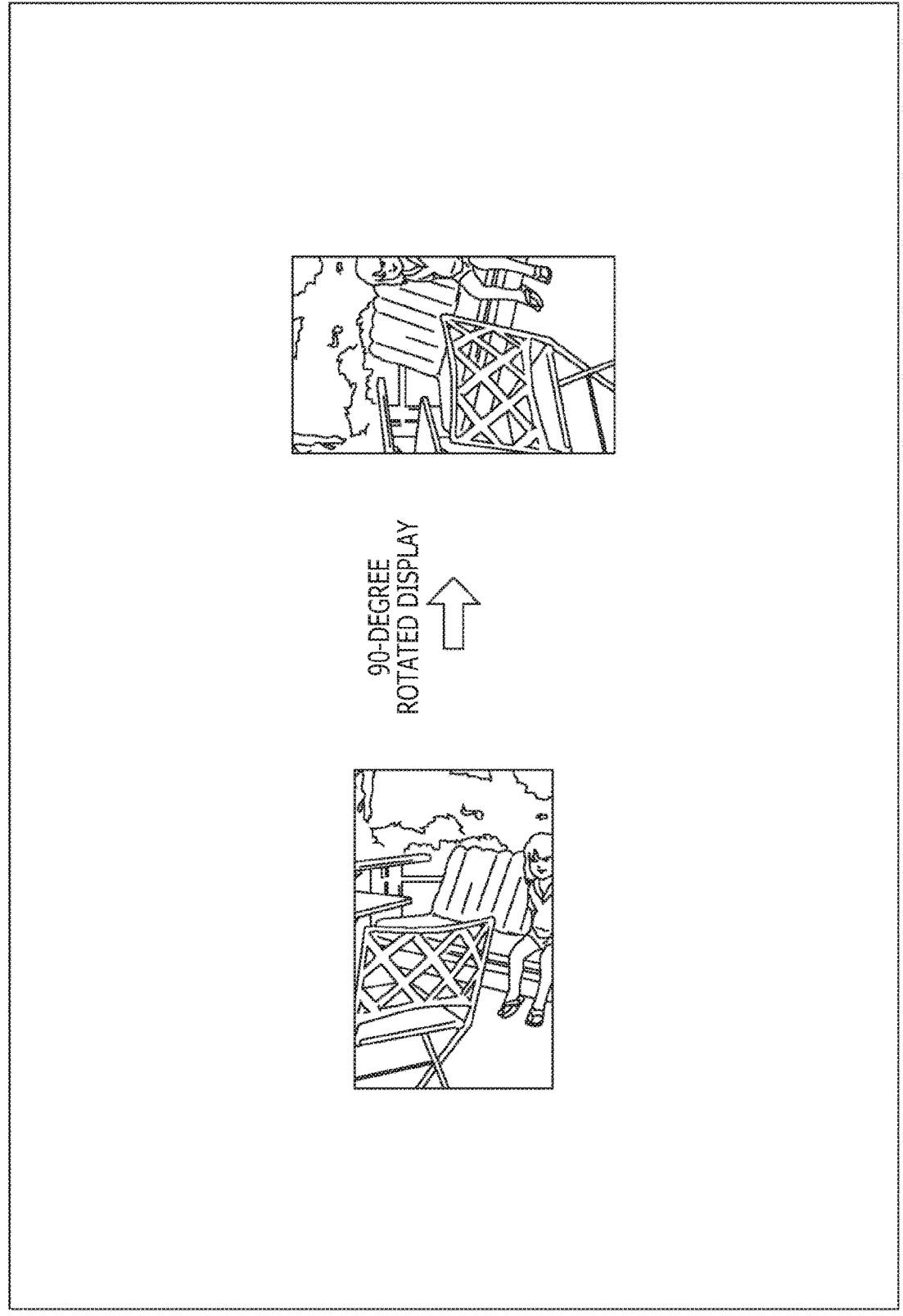
FIG. 14 is a diagram illustrating another example of how the image taken by the camera is rotated.

FIG. 14 is a diagram illustrating an example of how the image taken by the camera 16R is rotated.

The image illustrated in the left part of FIG. 14 is an image taken in the case where the camera 16R is horizontally installed as described with reference to FIG. 12. In a case where such an image is taken by the camera 16R, in the image processing device 21, the processing of rotating the image to the left by 90° is performed as indicated by the outline arrow, and the rotated image is displayed as a preview image. The tilt of the camera 16R is estimated on the basis of, for example, the taken image.

The display range of the preview image in the right part of FIG. 14 is switched to the right range when the camera 16R horizontally installed as illustrated in the lower part of FIG. 11 is moved to the right in the real space, and the display range of the preview image is switched to the left range when the camera 16R is moved to the left. Even in the case where the camera 16R is horizontally installed, the movement direction of the camera 16R in the real space matches the switching direction of a display range, and hence, the user can intuitively adjust the position and tilt of the camera 16R while watching a preview image.

In such a way, in the adjustment of the camera 16L or 16R, as a preview image, an image with which the movement direction of the camera 16L or 16R matches the switching direction of a display range is displayed.

In a case where an image taken by the horizontally installed camera is displayed as a preview image as it is, the movement direction of the camera 16L or 16R does not match the switching direction of the display range of the preview image, resulting in troublesome adjustment. The present disclosure can prevent such troublesome adjustment.

In the following, adjustment that the administrator of the multi-projection system 1 makes to match the orientation of the camera 16 with the orientation of the projector 13 is referred to as "global adjustment." Processing that the image processing device 21 performs to rotate an image depending on the tilt of the camera 16L or 16R to display the image as a preview image is referred to as "global adjustment processing."

The adjustment of the cameras 16L and 16R includes global adjustment and detailed adjustment described later.

<Example of Projection Image>

Figure 15:
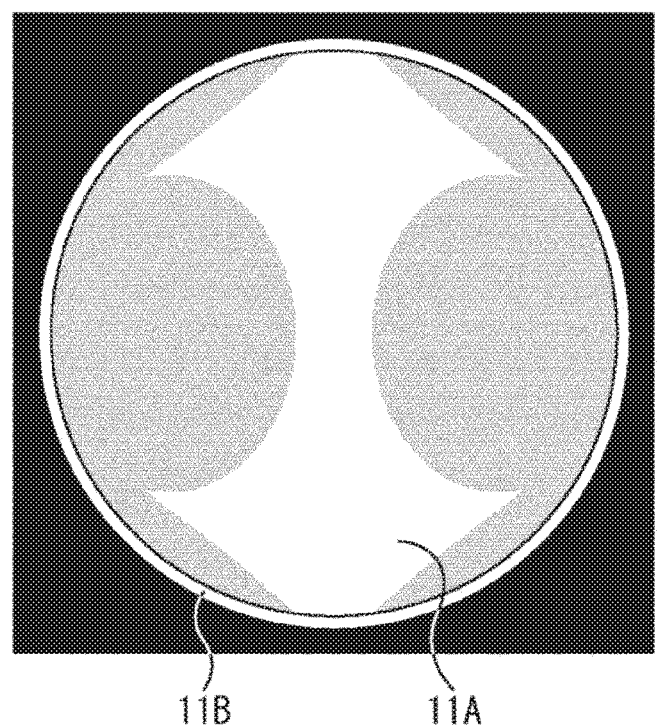
FIG. 15 is a diagram illustrating an example of the projection range of the projector.

FIG. 15 is a diagram illustrating an example of the projection range of the projector 13.

The circle illustrated in FIG. 15 represents the state of the projection surface 11A when viewed from the front surface. The display illustrated in FIG. 15 is achieved by the projector 13L and the projector 13R projecting images having no design or pattern and having constant luminance over the entire images. Since the multi-projection system 1 is in a dark environment, a region on the outer side of an edge portion 11B corresponding to the edge of the projection surface 11A is filled with black.

Figure 16A:
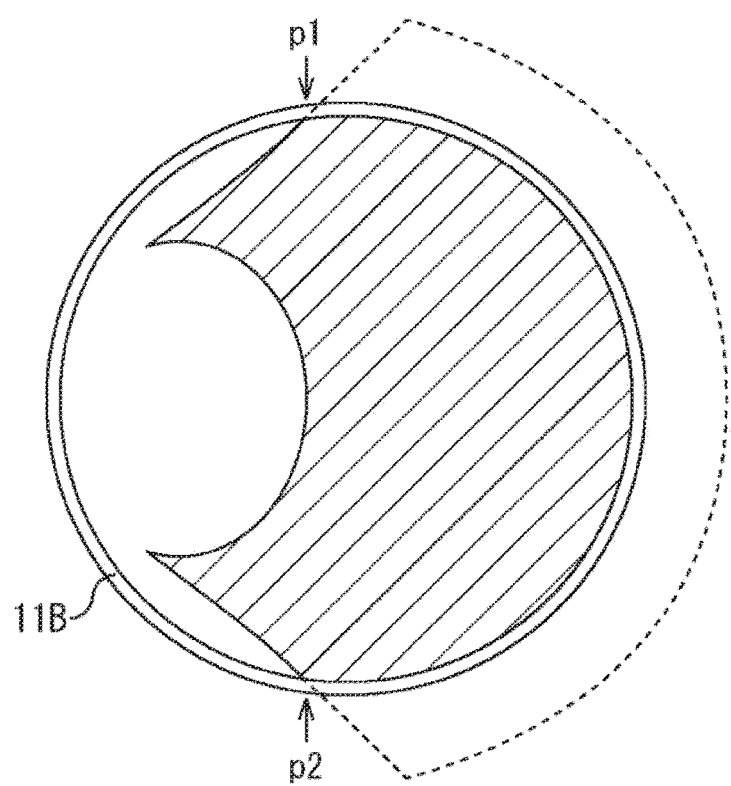
FIGS. 16A and 16B illustrate diagrams of examples of the projection ranges of the projectors.

The projection range of the projector 13L is a range indicated by the diagonal lines of FIG. 16A. As indicated by the broken line, an image projected from the projector 13L is partly projected on the outer side of an arc connecting a position p1 to a position p2 on the edge portion 11B of the dome screen 11.

Of the image projected from the projector 13L, a region projected outside the projection surface 11A is a black region (black light is projected outside the projection surface 11A).

Figure 16B:
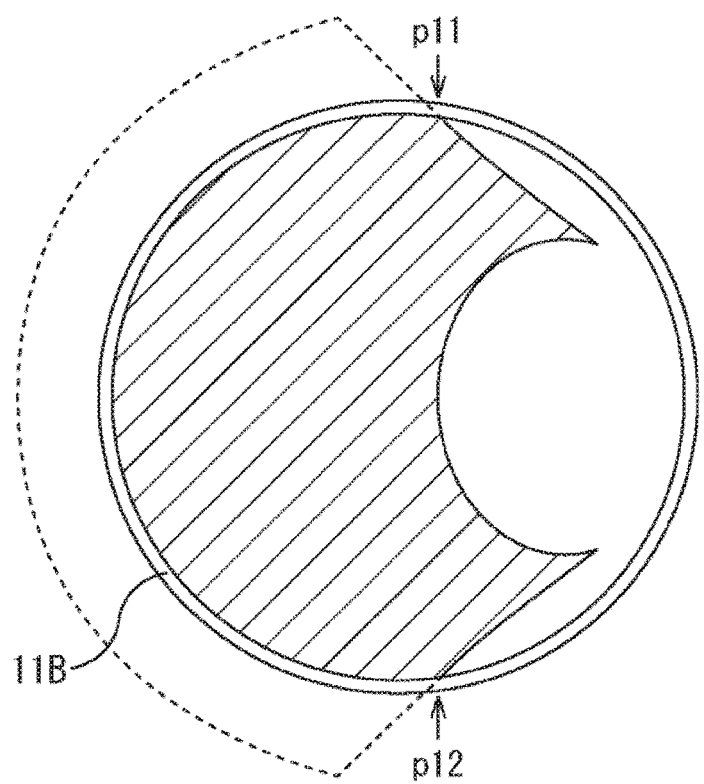

Meanwhile, the projection range of the projector 13R is a range indicated by the diagonal lines of FIG. 16B. As indicated by the broken line, an image projected from the projector 13R is partly projected on the outer side of an arc connecting a position p11 to a position p12 on the edge portion 11B of the dome screen 11.

Of the image projected from the projector 13R, a region projected outside the projection surface 11A is also a black region.

To such regions on the projection surface 11A, the images are projected from the projector 13L and the projector 13R. A range in which the range indicated by the diagonal lines of FIG. 16A and the range indicated by the diagonal lines of FIG. 16B overlap each other is an overlapping region in which the image from the projector 13L and the image from the projector 13R overlap each other.

The processing of matching the image from the projector 13L with the image from the projector 13R to prevent an image in the overlapping region from being blurred (to prevent a drop in resolution) is geometric correction.

Further, as illustrated in the vicinity of the center of FIG. 15, the luminance of the overlapping region is higher than the luminance of the surroundings. The processing of correcting the luminance of the overlapping region is optical correction.

<Global Adjustment>

As a method of displaying a preview image to be used in global adjustment that is adjustment for matching the orientation of the camera 16 with the orientation of the projector 13, for example, the following methods are given.

(1) A method in which a user manually rotates a preview image by 90°.

(2) A method in which a preview image is rotated depending on a tilt detected by a sensor built in a camera, such as an IMU.

(3) A method in which a preview image is rotated on the basis of a taken image obtained by a camera taking a pattern image projected from a projector.

Global adjustment of the above-mentioned item (3) using pattern images is described.

Figure 17:
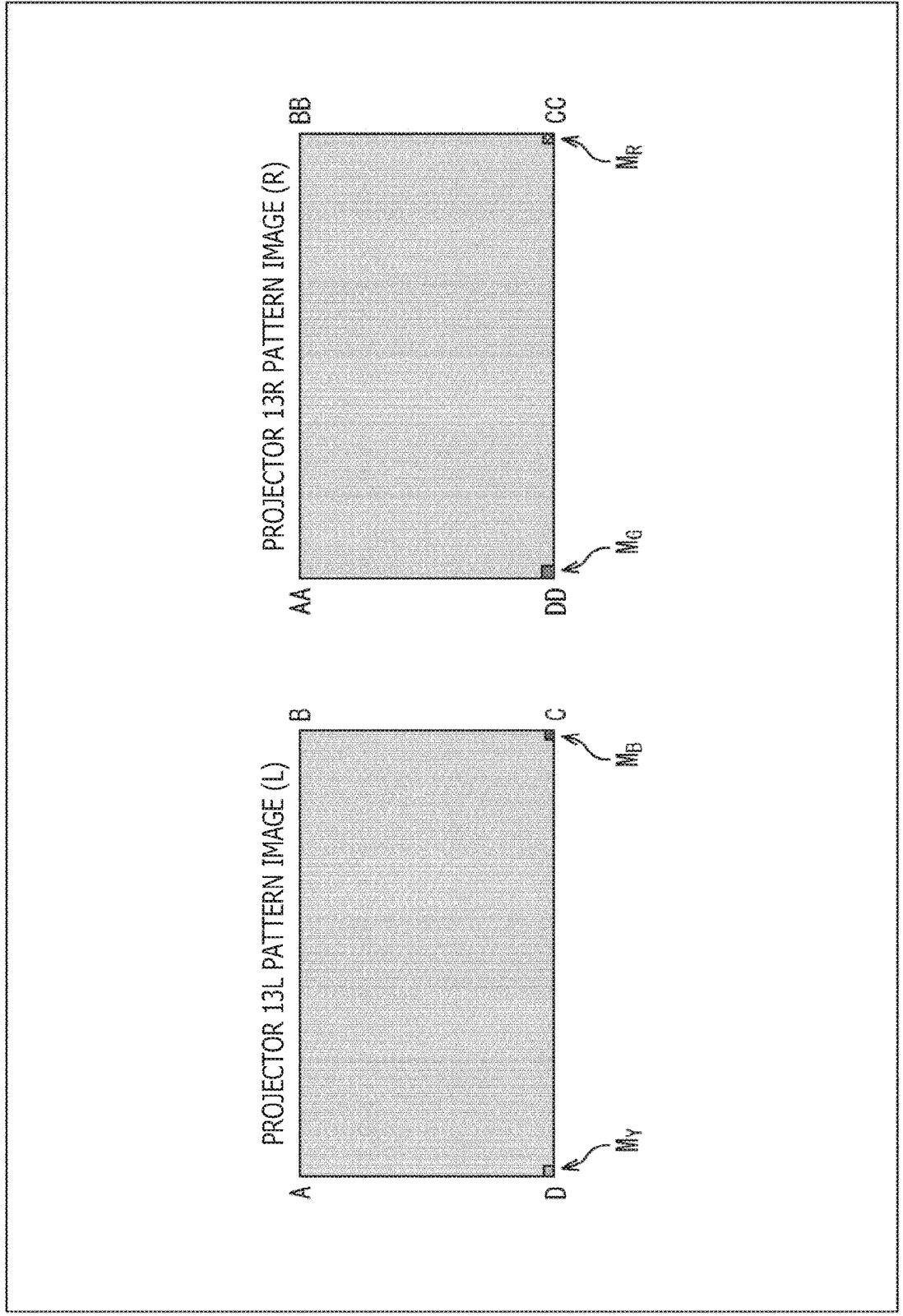
FIG. 17 is a diagram illustrating examples of pattern images.

FIG. 17 is a diagram illustrating examples of pattern images.

The image illustrated in the left part of FIG. 17 is a pattern image that is projected from the projector 13L in global adjustment. The pattern image that is projected from the projector 13L is referred to as a "pattern image L." The upper left corner, upper right corner, lower right corner, and lower left corner of the pattern image L are appropriately referred to as a "point A," a "point B," a "point C," and a "point D," respectively.

The pattern image L is an image in which a region other than the lower left corner and the lower right corner is displayed in gray with constant luminance. A mark $M_Y$ including yellow pixels is put at the lower left corner of the pattern image L, and a mark $M_B$ including blue pixels is put at the lower right corner. The mark $M_Y$ and the mark $M_B$ each include a predetermined number of pixels.

An image representing the pattern with the mark $M_Y$ put at the lower left corner and the mark $M_B$ put at the lower right corner is the pattern image L. The pattern image L is subjected to geometric correction (for example, geometric correction using default parameters) to be projected from the projector 13L.

Meanwhile, the image illustrated in the right part of FIG. 17 is a pattern image that is projected from the projector 13R in global adjustment. A pattern image that is projected from the projector 13R is referred to as a "pattern image R." The upper left corner, upper right corner, lower right corner, and lower left corner of the pattern image R are appropriately referred to as a "point AA," a "point BB," a "point CC," and a "point DD," respectively.

The pattern image R is an image in which a region other than the lower left corner and the lower right corner is displayed in gray with constant luminance. A mark $M_G$ having green pixels is put at the lower left corner of the pattern image R, and a mark $M_R$ having red pixels is put at the lower right corner. The mark $M_G$ and the mark $M_R$ each include a predetermined number of pixels.

An image representing the pattern with the mark $M_G$ put at the lower left corner and the mark $M_R$ put at the lower right corner is the pattern image R. The pattern image R is subjected to geometric correction to be projected from the projector 13R.

Figure 18:
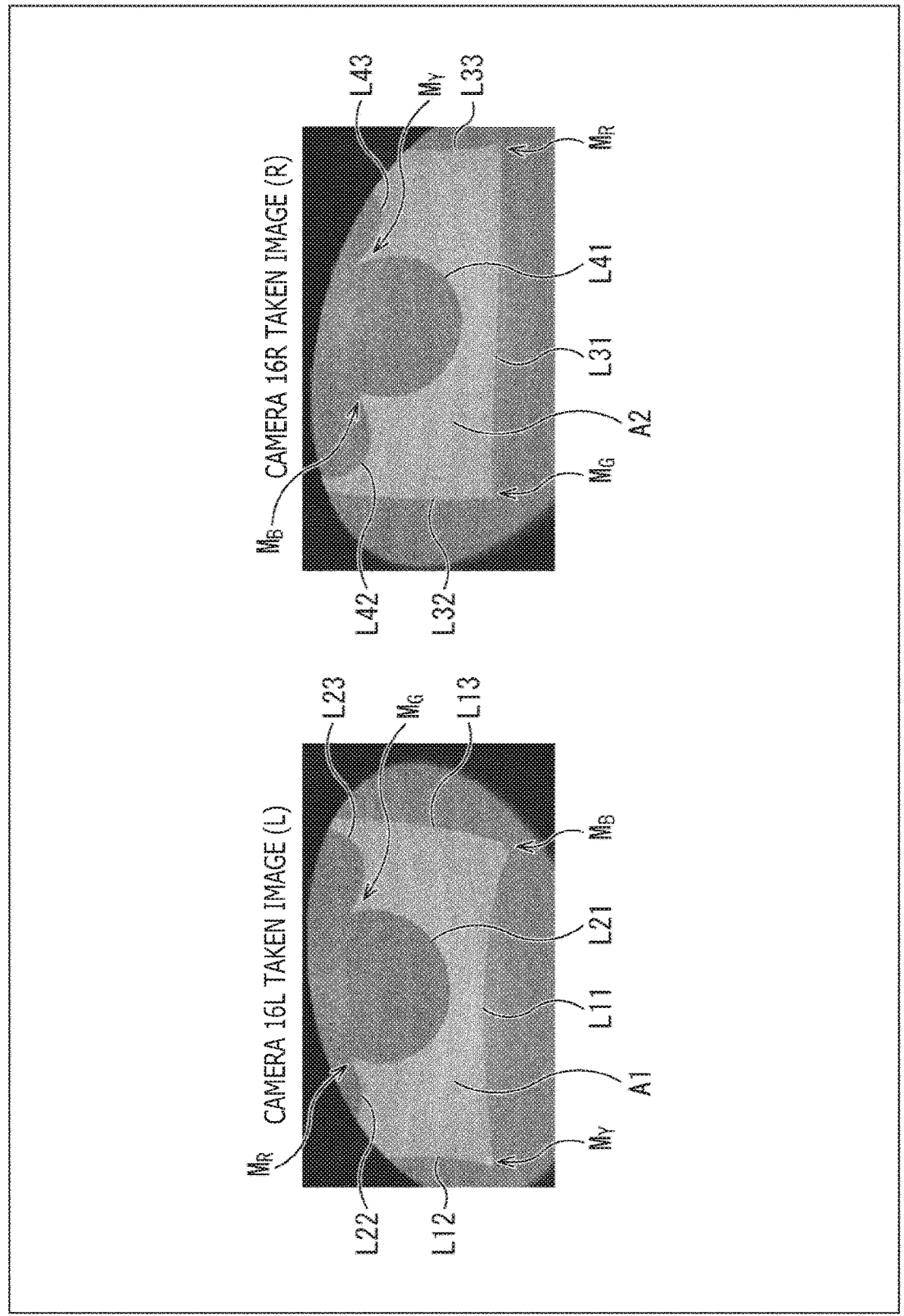
FIG. 18 is a diagram illustrating examples of taken images.

FIG. 18 is a diagram illustrating examples of taken images.

The image illustrated in the left part of FIG. 18 is a taken image obtained by photographing, by the camera 16L, a state with the pattern image L projected from the projector 13L and the pattern image R projected from the projector 13R. The taken image obtained by taking the pattern image L and the pattern image R by the camera 16L is referred to as a "taken image L."

In the taken image L, the distorted pattern image L and the distorted pattern image R projected on the projection surface 11A appear. A region A1 appearing with a higher luminance than the surroundings is an overlapping region.

A boundary line L11 appearing as a shallow curve in the lower part of the taken image L corresponds to the lower side connecting the point C to the point D of the pattern image L. A boundary line L12 appearing as a shallow curve in the left part of the taken image L corresponds to part of the left side connecting the point A to the point D of the pattern image L. A boundary line L13 appearing as a shallow curve in the right part of the taken image L corresponds to part of the right side connecting the point B to the point C of the pattern image L.

The mark $M_Y$ appears at the joining point between the boundary line L11 and the boundary line L12. Further, the mark $M_B$ appears at the joining point between the boundary line L11 and the boundary line L13.

An arc boundary line L21 appearing in the vicinity of the center of the taken image L corresponds to the lower side connecting the point CC to the point DD of the pattern image R. A boundary line L22 appearing as a shallow curve in the upper left of the taken image L corresponds to part of the right side connecting the point BB to the point CC of the pattern image R. A parabolic boundary line L23 appearing in the upper right of the taken image L corresponds to part of the left side connecting the point AA to the point DD of the pattern image R.

The mark $M_R$ appears at the joining point between the boundary line L21 and the boundary line L22. Further, the mark $M_G$ appears at the joining point between the boundary line L21 and the boundary line L23.

Meanwhile, the image illustrated in the right part of FIG. 18 is a taken image obtained by photographing, by the camera 16R, the state with the pattern image L projected from the projector 13L and the pattern image R projected from the projector 13R. The taken image obtained by taking the pattern image L and the pattern image R by the camera 16R is referred to as a "taken image R."

In the taken image R, the distorted pattern image L and the distorted pattern image R projected on the projection surface 11A appear. A region A2 appearing with a higher luminance than the surroundings is the overlapping region.

A substantially straight boundary line L31 appearing in the lower part of the taken image R corresponds to the lower side connecting the point CC to the point DD of the pattern image R. A boundary line L32 appearing as a shallow curve in the left part of the taken image R corresponds to part of the left side connecting the point AA to the point DD of the pattern image R. A boundary line L33 appearing as a shallow curve in the right part of the taken image R corresponds to part of the right side connecting the point BB to the point CC of the pattern image R.

The mark $M_G$ appears at the joining point between the boundary line L31 and the boundary line L32. Further, the mark $M_R$ appears at the joining point between the boundary line L31 and the boundary line L33.

An arc boundary line L41 appearing in the vicinity of the center of the taken image R corresponds to the lower side connecting the point C to the point D of the pattern image L. A parabolic boundary line L42 appearing in the upper left of the taken image R corresponds to part of the right side connecting the point B to the point C of the pattern image L. A boundary line L43 appearing as a shallow curve in the upper right of the taken image R corresponds to part of the left side connecting the point A to the point D of the pattern image L.

The mark $M_B$ appears at the joining point between the boundary line L41 and the boundary line L42. Further, the mark $M_Y$ appears at the joining point between the boundary line L41 and the boundary line L43.

In the image processing device 21, the marks $M_Y$, $M_B$, $M_G$, and $M_R$ are detected by analyzing the taken image L. The tilt of the camera 16L is estimated on the basis of the respective positions of the marks $M_Y$, $M_B$, $M_G$, and $M_R$ in the taken image L, and the taken image L is rotated depending on the estimated tilt to be displayed as a preview image.

Further, the marks $M_G$, $M_R$, $M_Y$, and $M_B$ are detected by analyzing the taken image R. The tilt of the camera 16R is estimated on the basis of the respective positions of the marks $M_G$, $M_R$, $M_Y$, and $M_B$ in the taken image R, and the taken image R is rotated depending on the estimated tilt to be displayed as a preview image.

FIG. 19 is a diagram illustrating examples of preview images.

As illustrated in the left part of FIG. 19, the image obtained by rotating the taken image L of FIG. 18 to the right by 90° is displayed as the preview image of the taken image L.

Further, as illustrated in the right part of FIG. 19, the image obtained by rotating the taken image R of FIG. 18 to the left by 90° is displayed as the preview image of the taken image R.

Each preview image is displayed at a predetermined position in the adjustment screen displayed on the display connected to the image processing device 21.

The administrator of the multi-projection system 1 matches the orientation of the camera 16 with the orientation of the projector 13 while watching the preview images illustrated in FIG. 19. The administrator can determine that the camera 16 faces the same orientation as the projector 13 with, for example, the four marks appearing in each preview image in the arrangements as illustrated in FIG. 19.

Figure 20:
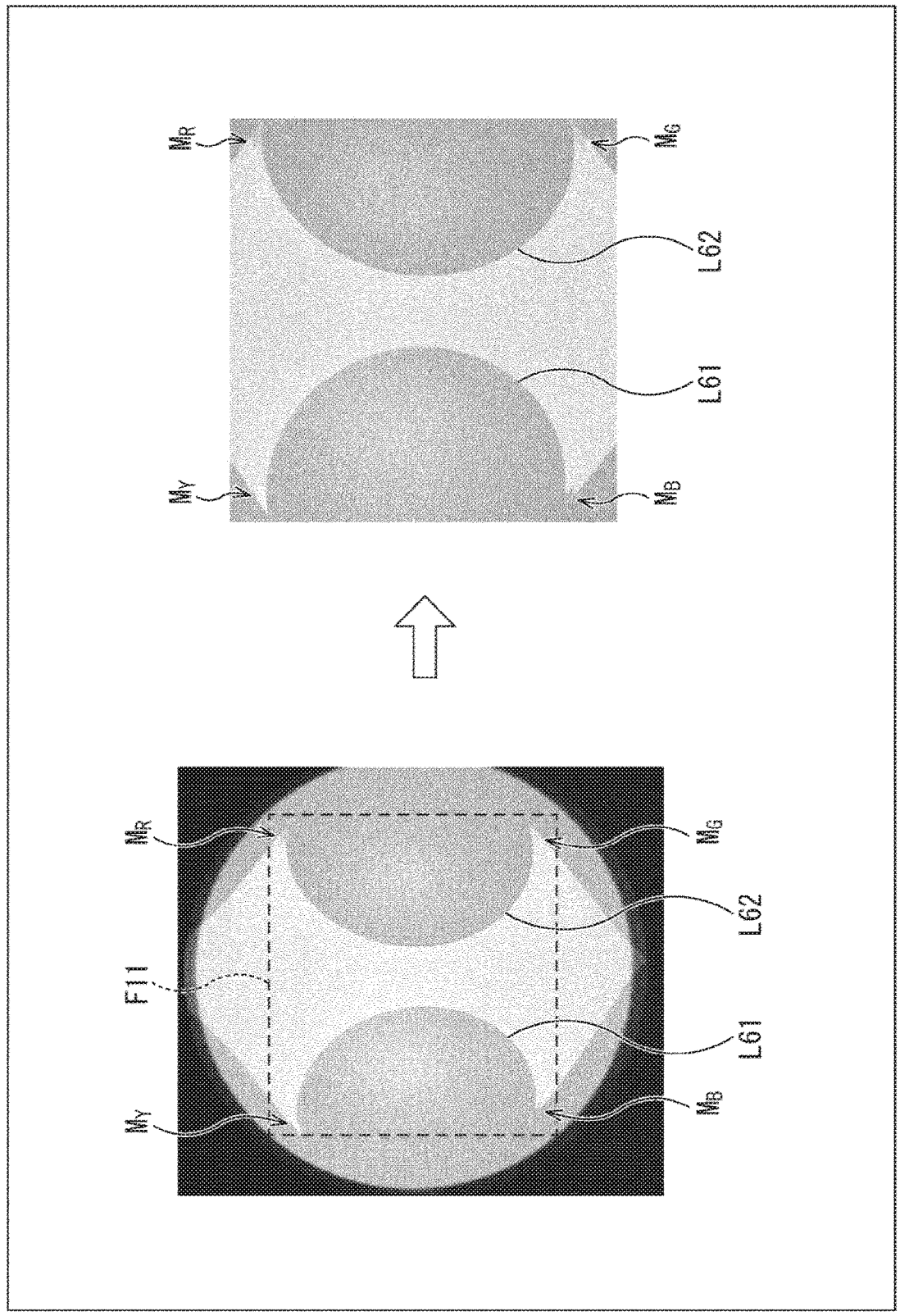
FIG. 20 is a front view illustrating a state in which pattern images have been projected.

FIG. 20 is a front view illustrating a state in which pattern images have been projected.

In a case where the state of the projection surface 11A on which the pattern image L has been projected from the projector 13L and the pattern image R has been projected from the projector 13R is photographed from the front of the projection surface 11A, an image as illustrated in the left part of FIG. 20 is obtained. The vertical direction of FIG. 20 corresponds to the vertical direction of the dome screen 11, and the horizontal direction of FIG. 20 corresponds to the horizontal direction of the dome screen 11.

For example, an arc boundary line L61 appearing on the left of the center of the projection surface 11A corresponds to the boundary line L11 appearing on the taken image L and the boundary line L41 appearing on the taken image R of FIG. 18. Further, an arc boundary line L62 appearing on the right of the center corresponds to the boundary line L21 appearing on the taken image L and the boundary line L31 appearing on the taken image R of FIG. 18.

The right illustration of FIG. 20 is obtained by enlarging the range of a frame F11. The mark $M_Y$ appears in the upper left, and the mark $M_B$ appears in the lower left. The mark $M_G$ appears in the lower right, and the mark $M_R$ appears in the upper right.

Note that, the vicinities of the upper left corner and upper right corner of the pattern image L and the vicinities of the upper left corner and upper right corner of the pattern image R are projected outside the projection surface 11A as described with reference to FIGS. 16A and 16B. Of the light of each pattern image, the light of each mark is emitted on a predetermined position on the projection surface 11A while the light of the upper left corner and upper right corner is emitted on positions outside the projection surface 11A.

Figure 21:
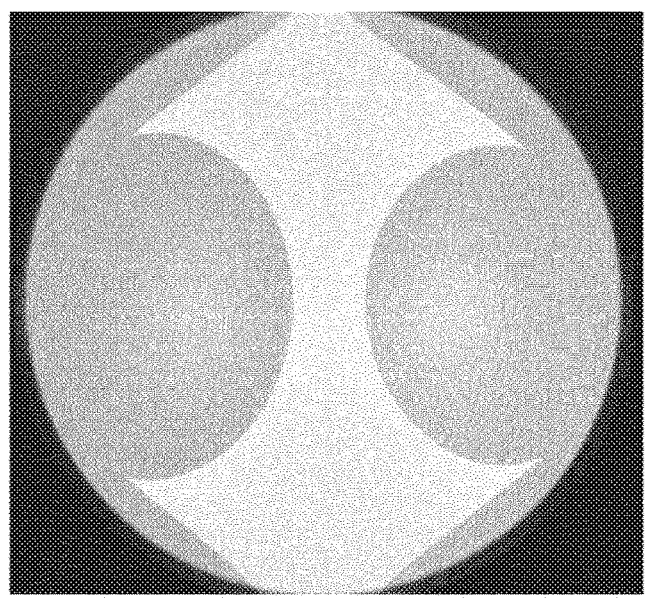
FIG. 21 is another front view illustrating the state in which the pattern images have been projected.

FIG. 21 is another front view illustrating the state in which the pattern images have been projected.

For example, in a case where the pattern images are projected from the projectors 13L and 13R mounted upside down, as illustrated in FIG. 21, the marks put on the pattern images are not projected on the projection surface 11A (projected outside the projection surface 11A).

The fact that it has been detected that the marks do not appear in the images taken by the camera 16L and the camera 16R means that the projectors 13L and 13R are mounted upside down.

In the case where the marks do not appear in an image taken by the camera 16, information indicating that the projector 13 is mounted upside down may be displayed to be notified to the administrator.

Through such global adjustment, the orientation of the camera 16 is adjusted to be matched with the orientation of the projector 13 such that the upper surfaces of both the components face the user.

<Detailed Adjustment>

To prevent an image in an overlapping region from being blurred, geometric correction that matches an image from the projector 13L with an image from the projector 13R is necessary.

To perform geometric correction with high accuracy, it is necessary that the positions and tilts of the cameras 16L and 16 be adjusted to positions and tilts at which the cameras can photograph the entire overlapping region.

Further, to detect the edge portion 11B, thereby reducing light emitted outside the dome screen 11 (light projected outside the projection surface 11A), it is necessary that the positions and tilts of the cameras 16L and 16 be adjusted to positions and tilts at which the cameras can photograph the entire edge portion 11B of the dome screen 11.

As described above, in the image processing device 21, of an image projected from the projector 13, a region projected outside the projection surface 11A is set as a black region. With the accurate detection of the entire edge portion 11B and the correct setting of a region projected outside the projection surface 11A, light emitted outside the dome screen 11 can be reduced.

Figure 22:
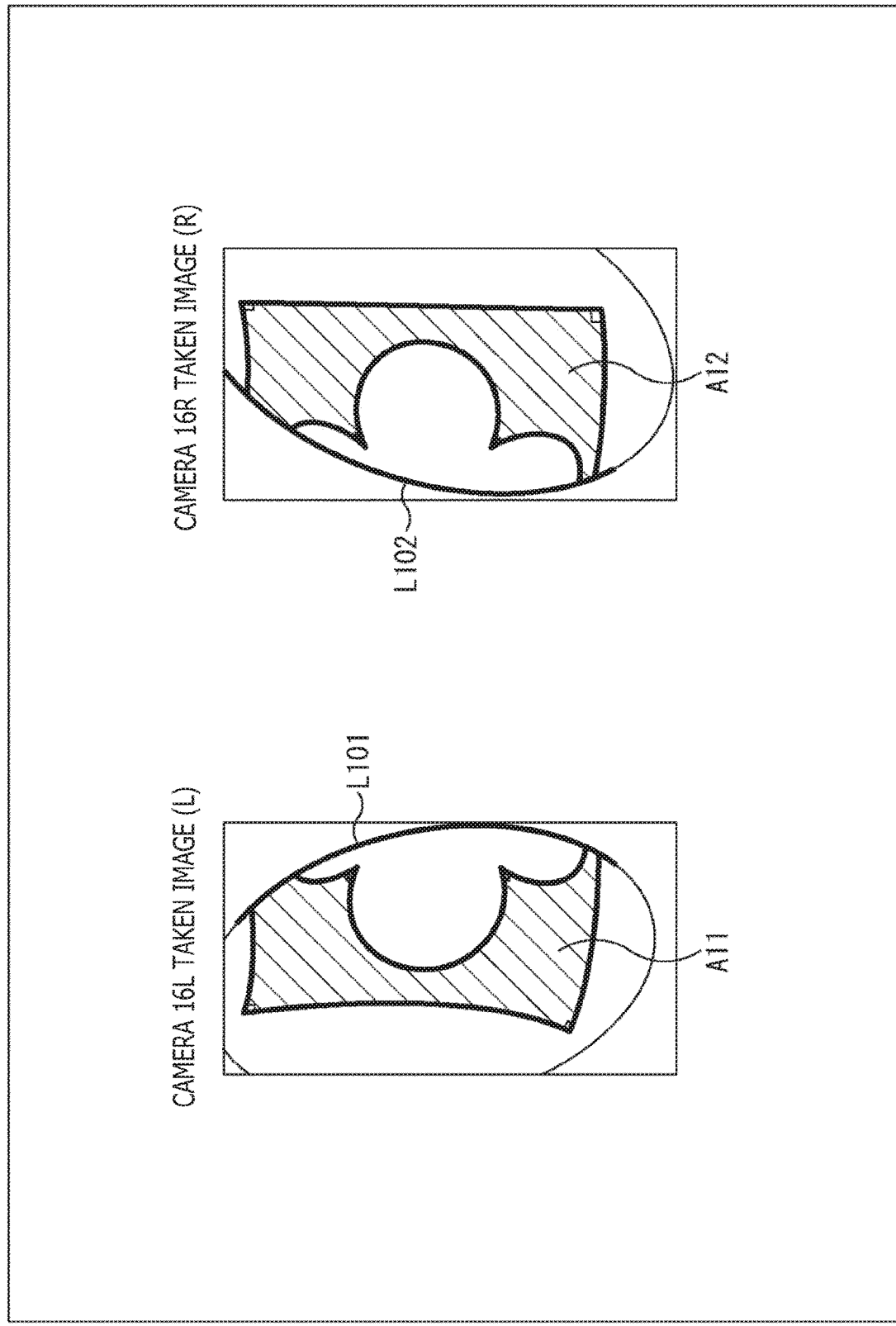
FIG. 22 is a diagram illustrating examples of the preview images.

FIG. 22 is a diagram illustrating examples of the preview images.

In the example of FIG. 22, the preview images are schematically illustrated. When, as illustrated in the left part of FIG. 22, an overlapping region A11 indicated by the diagonal lines and the edge portion 11B included in the projection range of the projector 13L, which is indicated by a thick line L101, appear in the preview image of the camera 16L, it can be said that the camera 16L has been adjusted to an appropriate position and tilt. The arc indicated by the thick line L101 corresponds to the arc connecting the position p1 to the position p2 described with reference to FIG. 16A.

Further, when, as illustrated in the right part of FIG. 22, an overlapping region A12 indicated by the diagonal lines and the edge portion 11B included in the projection range of the projector 13R, which is indicated by a thick line L102, appear in the preview image of the camera 16R, it can be said that the camera 16R has been adjusted to an appropriate position and tilt. The arc indicated by the thick line L102 corresponds to the arc connecting the position p11 to the position p12 described with reference to FIG. 16B.

When the edge portion 11B corresponding to the arc connecting the position p1 to the position p2 of FIG. 16A appears in the preview image of the camera 16L and the edge portion 11B corresponding to the arc connecting the position p11 to the position p12 of FIG. 16B appears in the preview image of the camera 16R, the edge portion 11B has been able to be entirely photographed.

Whether or not an overlapping region appears and whether or not the edge portion 11B of the dome screen 11 entirely appears are criteria of determination on whether or not the cameras 16L and 16R have been adjusted to appropriate positions and tilts.

Adjustment that the administrator of the multi-projection system 1 makes to adjust the positions and tilts of the cameras 16L and 16R while watching preview images in such a way is referred to as "detailed adjustment." Processing that the image processing device 21 performs to analyze images taken by the cameras 16L and 16R to determine whether or not the cameras have been adjusted to appropriate positions and tilts is referred to as "detailed adjustment processing."

In a case where the cameras have not been adjusted to appropriate positions and tilts, for example, information for guiding movement directions of the cameras 16L and 16R is displayed by being superimposed on the preview images. The administrator of the multi-projection system 1 can adjust the respective positions and tilts of the cameras 16L and 16R by following the displayed information to move the cameras.

FIG. 23 is a diagram illustrating examples of the preview images.

In the preview image of the camera 16L illustrated in the left part of FIG. 23, the edge portion 11B is cut off. In a case where the preview image illustrated in the left part of FIG. 23 is displayed, in the image processing device 21, it is determined that the camera 16L is at inappropriate position and tilt.

In such a case, information for guiding a movement direction of the camera 16L as illustrated in the left part of FIG. 24 is displayed. In the example of FIG. 24, the arrow image is displayed as information for guiding a movement direction.

The administrator of the multi-projection system 1 can adjust the camera 16L to an appropriate position and tilt by following such a guide to move the camera 16L to the right.

Further, in the preview image of the camera 16R illustrated in the right part of FIG. 23, the overlapping region is cut off. In a case where the preview image illustrated in the right part of FIG. 23 is displayed, in the image processing device 21, it is determined that the camera 16R is at inappropriate position and tilt.

In such a case, information for guiding a movement direction of the camera 16R as illustrated in the right part of FIG. 24 is displayed. The administrator of the multi-projection system 1 can adjust the camera 16R to an appropriate position and tilt by following such a guide to move the camera 16R down.

The movement directions of the cameras 16L and 16R are detected on the basis of, for example, the positions of the marks of the pattern images.

FIG. 25 is a diagram illustrating an example of guide information.

In a case where it is determined that the cameras 16L and 16R have been adjusted to appropriate positions and tilts, as illustrated in FIG. 25, information for notifying that the cameras 16L and 16R are at appropriate positions and tilts is displayed. In the example of FIG. 25, as information for notifying that the cameras 16L and 16R are at appropriate positions and tilts, a term "OK" is displayed in the upper left of each preview image.

Since guide information is displayed, even in a case where the administrator of the multi-projection system 1 is not used to the adjustment, the administrator can adjust the cameras 16L and 16R to appropriate positions and tilts. Even a person who does not know the above-mentioned conditions, which serve as the indices, can adjust the cameras 16L and 16R, and hence, the operability of the multi-projection system 1 can be enhanced.

Since the movement direction of the camera 16 matches the switching direction of the display range of a preview image, the administrator of the multi-projection system 1 can intuitively adjust the positions and tilts of the cameras 16L and 16.

<Configuration of Image Processing Device>

Figure 26:
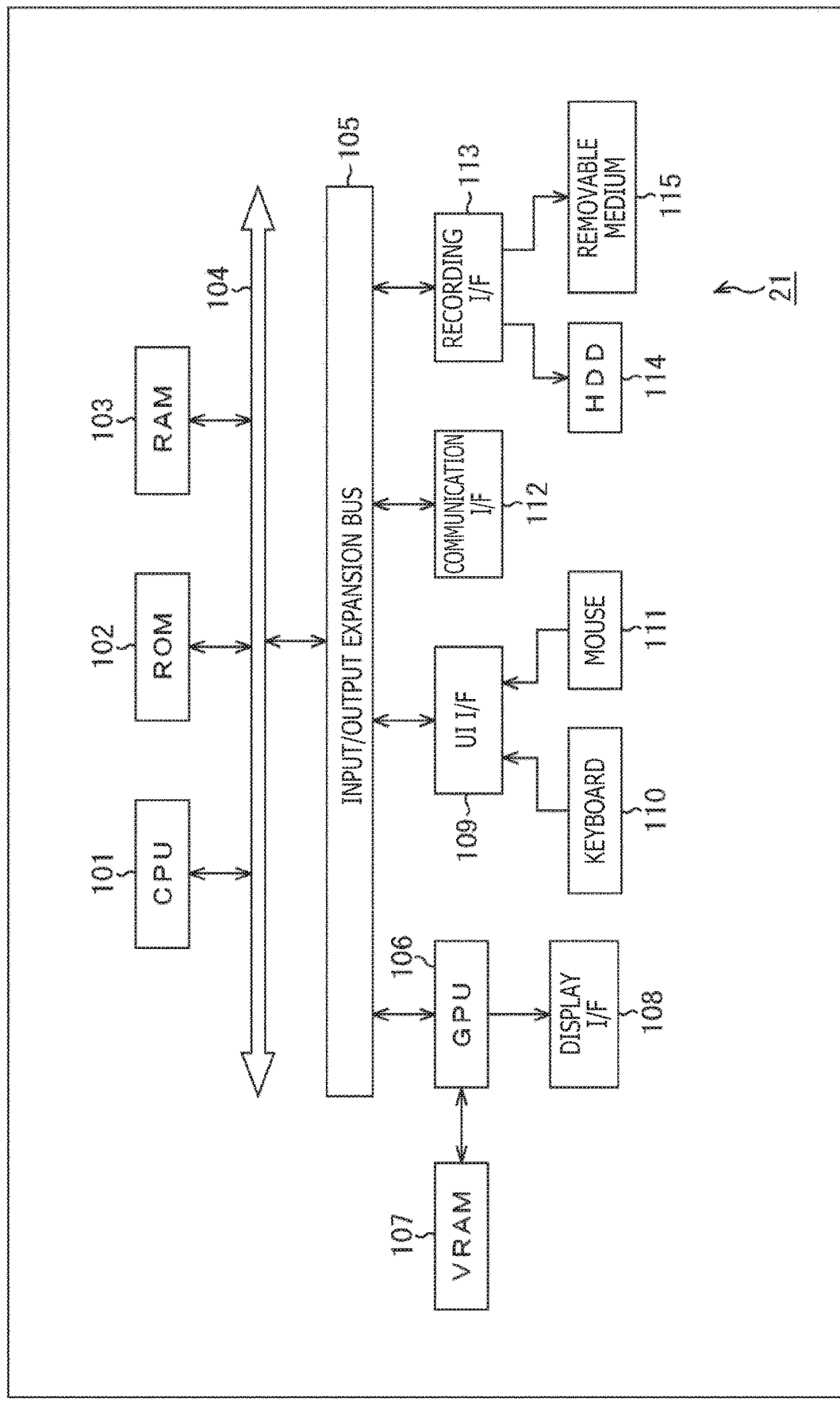
FIG. 26 is a block diagram illustrating a hardware configuration example of an image processing device.

FIG. 26 is a block diagram illustrating a hardware configuration example of the image processing device 21.

A CPU (Central Processing Unit) 101, a ROM (Read Only Memory) 102, and a RAM (Random Access Memory) 103 are connected to each other by a bus 104.

To the bus 104, an input/output expansion bus 105 is also connected. To the input/output expansion bus 105, a GPU (Graphics Processing Unit) 106, a UI (User Interface) I/F 109, a communication I/F 112, and a recording I/F 113 are connected.

The GPU 106 renders, using a VRAM 107, projection images that are projected from the projectors 13L and 13R.

For example, the GPU 106 generates projection images that are projected from the respective projectors 13L and 13R and outputs the projection images to the display I/F 108.

The display I/F 108 is a projection image output interface. The display I/F 108 is configured as an interface conforming to a predetermined standard, for example, HDMI (registered trademark) (High-Definition Multimedia Interface). The display I/F 108 outputs, to the projector 13L and the projector 13R, projection images supplied from the GPU 106, and controls the projector 13L and the projector 13R to project the projection images.

To the display I/F 108, the display such as an LCD or an organic EL display is also connected. The display I/F 108 controls the display to display the adjustment screen including preview images.

The UI I/F 109 is an operation detecting interface. The UI I/F 109 detects operation made using a keyboard 110 or a mouse 111 and outputs information indicating the operation content to the CPU 101. Operation is made using the keyboard 110 or the mouse 111 by, for example, the administrator of the multi-projection system 1.

The communication I/F 112 is an interface for communication with external devices. The communication I/F 112 is configured by a network interface such as a wireless LAN or a wired LAN. The communication I/F 112 communicates with external devices via a network such as the Internet, to thereby transmit or receive various kinds of data. Content that is reproduced in the multi-projection system 1 may be provided from a server via a network.

The communication I/F 112 appropriately transmits data regarding the sound of content to the surround speaker 14 and the woofer 15 and receives data regarding images taken by the cameras 16L and 16R and then transmitted from the cameras 16L and 16R, for example. In a case where a sensor or the like configured to detect the motion of the user is provided to the chair, the communication I/F 112 also receives sensor data transmitted from the sensor.

The recording I/F 113 is a recording medium interface. On the recording I/F 113, recording media such as an HDD 114 and a removable medium 115 are mounted. The recording I/F 113 reads out data recorded on the mounted recording media and writes data to the recording media. On the HDD 114, in addition to content, various kinds of data such as pattern image data and programs that the CPU 101 executes are recorded.

Figure 27:
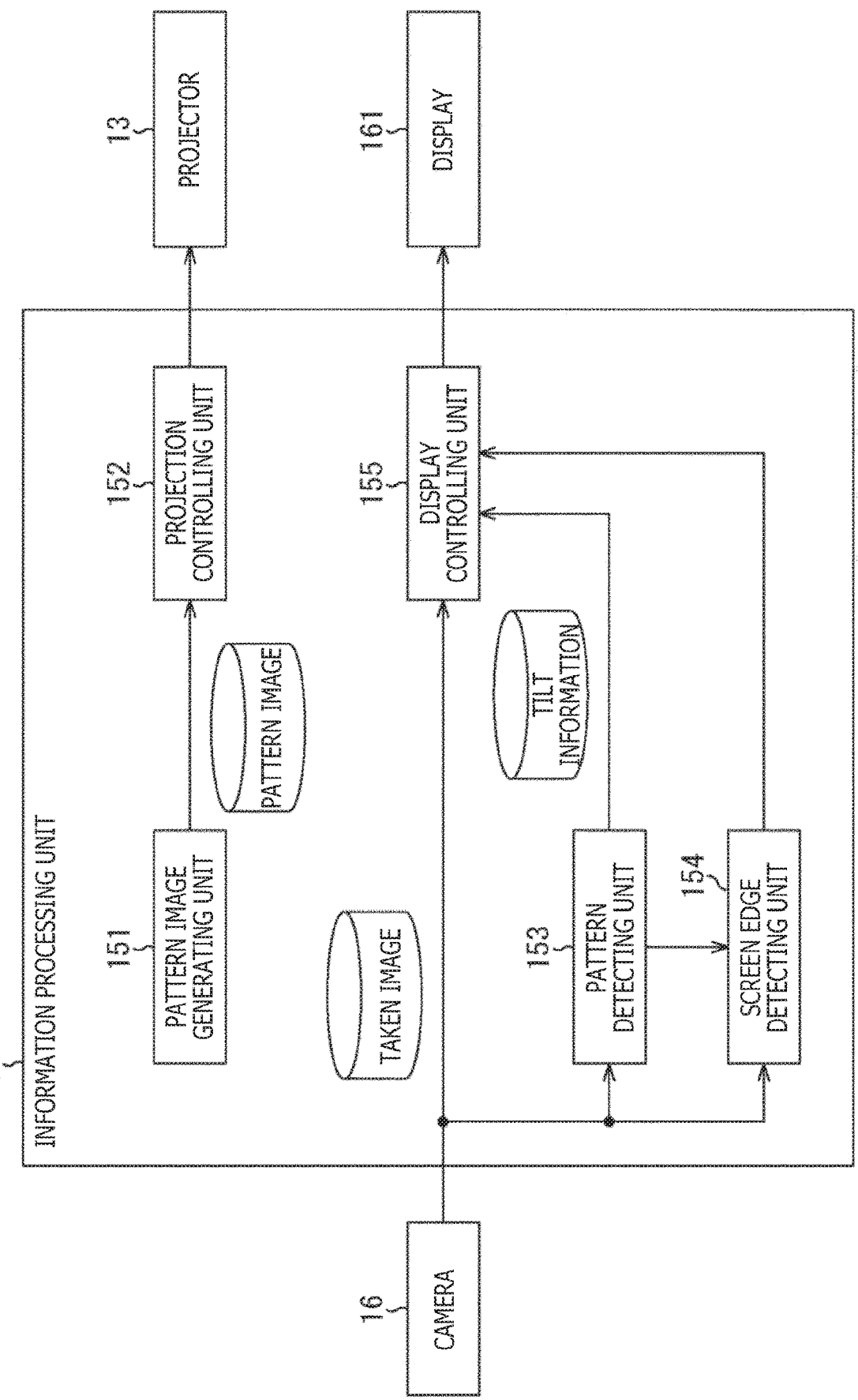
FIG. 27 is a block diagram illustrating a functional configuration example of the image processing device.

FIG. 27 is a block diagram illustrating a functional configuration example of the image processing device 21.

As illustrated in FIG. 27, in the image processing device 21, an information processing unit 131 is implemented. The information processing unit 131 includes a pattern image generating unit 151, a projection controlling unit 152, a pattern detecting unit 153, a screen edge detecting unit 154, and a display controlling unit 155. At least a part of the functional units illustrated in FIG. 27 is implemented by the CPU 101 of FIG. 26 executing predetermined programs.

A taken image taken by the camera 16 is supplied to the pattern detecting unit 153 and the display controlling unit 155 in global adjustment, and is supplied to the pattern detecting unit 153, the screen edge detecting unit 154, and the display controlling unit 155 in detailed adjustment. In a taken image that is supplied to each unit, a pattern image projected on the projection surface 11A appears.

The pattern image generating unit 151 generates pattern images in global adjustment. The pattern image generating unit 151 generates pattern images also in detailed adjustment. The pattern images generated by the pattern image generating unit 151 are supplied to the projection controlling unit 152.

In global adjustment, the projection controlling unit 152 performs, using default parameters, for example, geometric correction on pattern images generated by the pattern image generating unit 151, to thereby generate a projection image for the projector 13L and a projection image for the projector 13R. Parameters that are used in geometric correction serve as information associating pixels of a pattern image with pixels on the projection surface 11A.

The projection controlling unit 152 controls the display I/F 108 to output each projection image to the projector 13 and controls the projector 13 to project the projection image. Pattern images are projected also in detailed adjustment.

The pattern detecting unit 153 analyzes, in global adjustment, a taken image to detect the marks put at the lower left corner and lower right corner of the pattern image. The pattern detecting unit 153 estimates the tilt of the camera 16 on the basis of the position of each mark on the taken image, and outputs information indicating the estimated tilt to the display controlling unit 155. The pattern detecting unit 153 functions as an estimation unit configured to estimate the tilt of the camera 16 on the basis of the position of each mark on a taken image.

Further, the pattern detecting unit 153 analyzes, in detailed adjustment, a taken image to detect the marks put at the lower left corner and lower right corner of the pattern image. The pattern detecting unit 153 outputs information indicating the position of each mark on the taken image to the screen edge detecting unit 154.

The screen edge detecting unit 154 performs, in detailed adjustment, edge detection on the basis of the luminance of each pixel of a taken image to detect an overlapping region. In edge detection, the positions of the marks detected by the pattern detecting unit 153 serve as starting points, for example.

Further, the screen edge detecting unit 154 performs, in detailed adjustment, edge detection on the basis of the luminance of each pixel to detect the edge portion 11B of the dome screen 11. A region on the outer side of the edge portion 11B appears as a dark region in a taken image as described above. For example, a position at which the luminance suddenly drops is detected as the position of the edge portion 11B. In a case where an overlapping region has been detected, the edge portion 11B is detected with a starting point being the boundary line of the overlapping region.

In a case where an overlapping region and the entire edge portion 11B appear in a taken image, the screen edge detecting unit 154 outputs information indicating the fact to the display controlling unit 155. Further, in a case where one of an overlapping region and the entire edge portion 11B does not appear in a taken image, the screen edge detecting unit 154 outputs information indicating a movement direction of the camera 16 to the display controlling unit 155.

The display controlling unit 155 controls display on the adjustment screen that is displayed by a display 161. The display controlling unit 155 rotates, in global adjustment, a taken image supplied from the camera 16 depending on the tilt of the camera 16 estimated by the pattern detecting unit 153, and performs control to display the rotated taken image on the adjustment screen as a preview image.

Further, similarly to global adjustment, the display controlling unit 155 rotates, in detailed adjustment, a taken image supplied from the camera 16 and controls the display 161 to display the rotated taken image as a preview image.

In detailed adjustment, in a case where the screen edge detecting unit 154 has detected that an overlapping region and the entire edge portion 11B appear in a taken image, the display controlling unit 155 performs control to display information indicating that the camera 16 is at an appropriate position and tilt on the adjustment screen. Further, in detailed adjustment, in a case where the screen edge detecting unit 154 has detected that any of an overlapping region and the entire edge portion 11B does not appear in a taken image, the display controlling unit 155 performs control to display information for guiding a movement direction of the camera 16 on the adjustment screen on the basis of the information supplied from the screen edge detecting unit 154.

<Operation of Image Processing Device>

Figure 28:
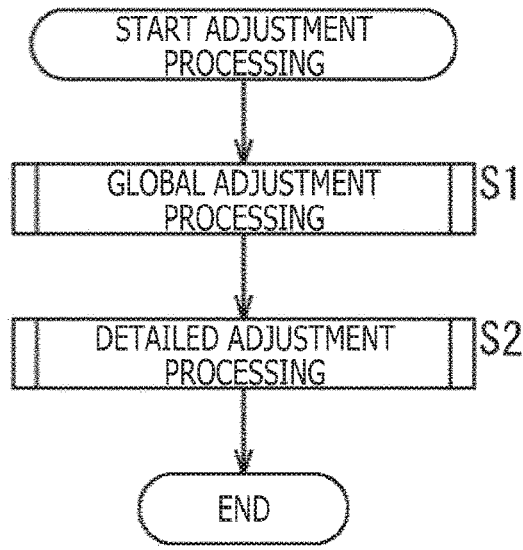
FIG. 28 is a flowchart illustrating adjustment processing by the image processing device.

Here, with reference to the flowchart of FIG. 28, adjustment processing that the image processing device 21, which has the configuration as described above, performs is described.

In Step S1, the information processing unit 131 performs the global adjustment processing. The administrator of the multi-projection system 1 matches the tilt of the camera 16 with the tilt of the projector 13 while watching a preview image displayed as a result of the global adjustment processing. The details of the global adjustment processing are described later with reference to the flowchart of FIG. 29.

In Step S2, the information processing unit 131 performs the detailed adjustment processing. The administrator of the multi-projection system 1 adjusts the camera 16 to an appropriate position and tilt while watching a preview image displayed as a result of the detailed adjustment processing. The details of the detailed adjustment processing are described later with reference to the flowchart of FIG. 30.

Figure 29:
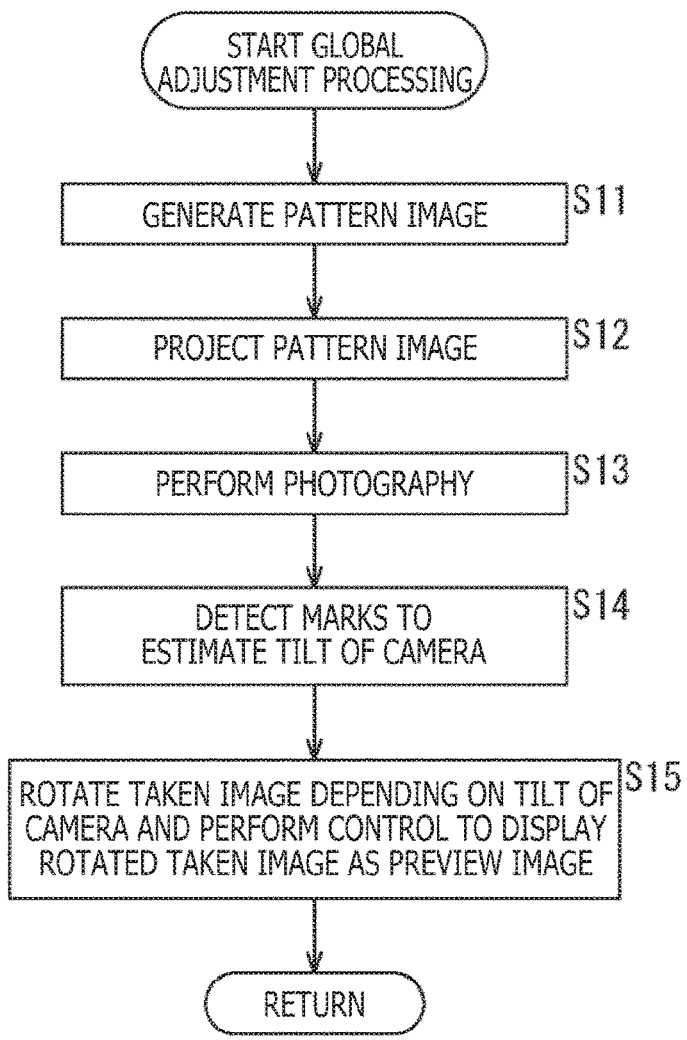
FIG. 29 is a flowchart illustrating global adjustment processing that is performed in Step S1 of FIG. 28.

Next, with reference to the flowchart of FIG. 29, the global adjustment processing that is performed in Step S1 of FIG. 28 is described.

In Step S11, the pattern image generating unit 151 generates pattern images.

In Step S12, the projection controlling unit 152 generates, on the basis of the pattern images generated by the pattern image generating unit 151, a projection image for the projector 13L and a projection image for the projector 13R and controls the projector 13L and the projector 13R to project the respective projection images.

In Step S13, the camera 16 photographs the projection surface 11A on which the pattern images have been projected from the projector 13L and the projector 13R.

In Step S14, the pattern detecting unit 153 analyzes the taken image to detect the marks put at the lower left corner and lower right corner of the pattern image, to thereby estimate the tilt of the camera 16.

In Step S15, the display controlling unit 155 rotates the taken image depending on the tilt of the camera 16 estimated by the pattern detecting unit 153 and performs control to display the rotated taken image on the adjustment screen as a preview image. The taken image is appropriately rotated as needed.

After the preview image has been displayed, the processing returns to Step S1 of FIG. 28, and the subsequent processing is performed.

Figure 30:
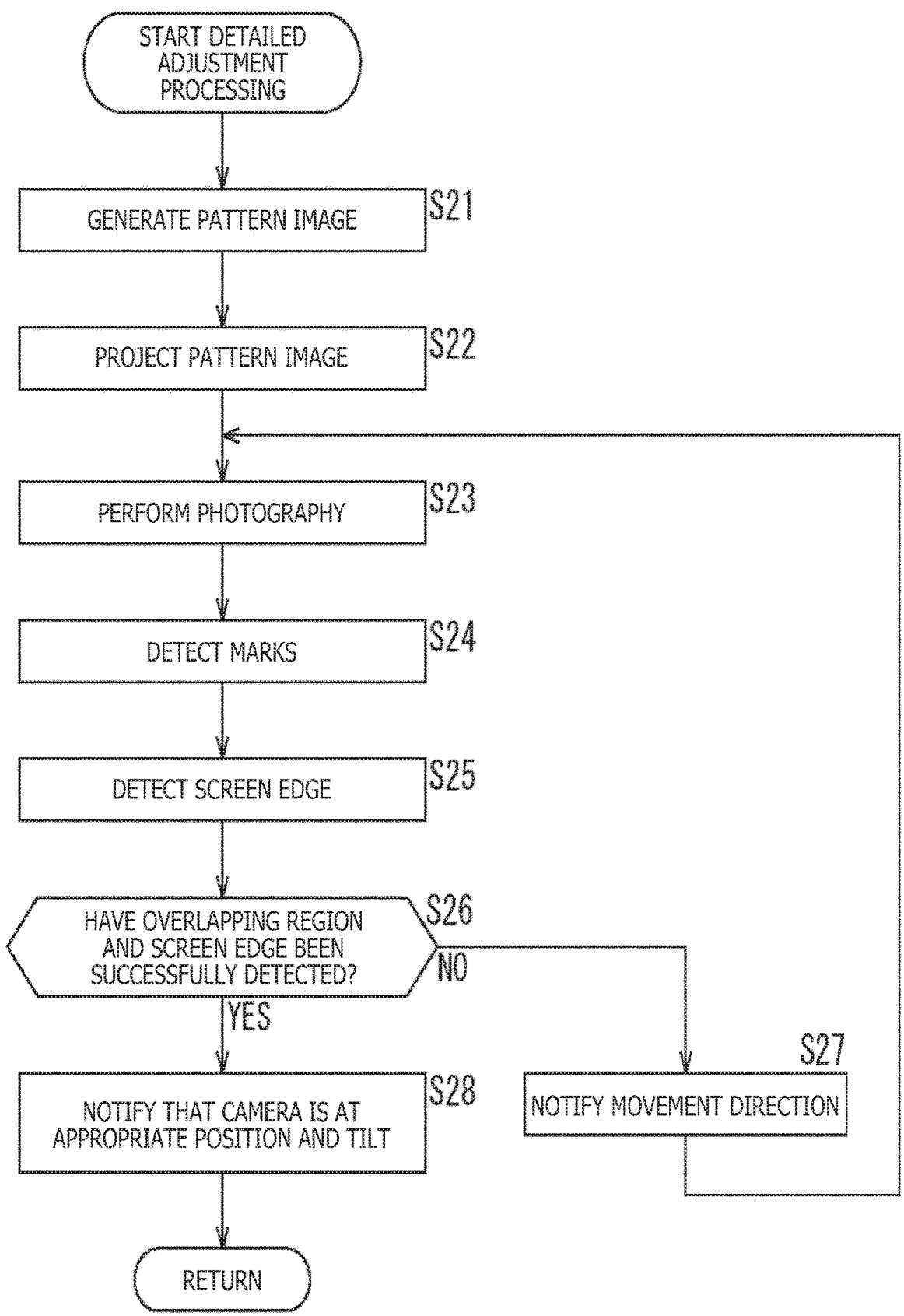
FIG. 30 is a flowchart illustrating detailed adjustment processing that is performed in Step S2 of FIG. 28.

Next, with reference to the flowchart of FIG. 30, the detailed adjustment processing that is performed in Step S2 of FIG. 28 is described.

In Step S21, the pattern image generating unit 151 generates pattern images.

In Step S22, the projection controlling unit 152 generates, on the basis of the pattern images generated by the pattern image generating unit 151, a projection image for the projector 13L and a projection image for the projector 13R and controls the projector 13L and the projector 13R to project the respective projection images.

In Step S23, the camera 16 photographs the projection surface 11A on which the pattern images have been projected from the projector 13L and the projector 13R.

In Step S24, the pattern detecting unit 153 analyzes the taken image to detect the marks put at the lower left corner and lower right corner of the pattern image.

In Step S25, the screen edge detecting unit 154 detects the edge of the taken image to detect an overlapping region and the edge of the screen, namely, the edge portion 11B of the dome screen 11.

Here, similarly to global adjustment, the processing of estimating the tilt of the camera 16 on the basis of the positions of the marks and appropriately rotating the taken image depending on the tilt of the camera 16 is performed. On the adjustment screen, the preview image is continuously displayed.

In Step S26, the screen edge detecting unit 154 determines whether or not the overlapping region and the edge portion 11B of the dome screen 11 have been successfully detected.

In a case where it is determined in Step S26 that neither the overlapping region nor the edge portion 11B of the dome screen 11 has been successfully detected, in Step S27, the display controlling unit 155 performs, on the basis of the information supplied from the screen edge detecting unit 154, control to display information for guiding a movement direction of the camera 16 on the adjustment screen. After that, the processing returns to Step S23, and the processing described above is repeated.

Meanwhile, in a case where it is determined in Step S26 that both the overlapping region and the edge portion 11B of the dome screen 11 have been successfully detected, the processing proceeds to Step S28.

In Step S28, the display controlling unit 155 performs control to display, on the adjustment screen, information indicating that the camera 16 is at an appropriate position and tilt. After that, the processing returns to Step S2 of FIG. 28, and the subsequent processing is performed.

After the adjustment of the position and tilt of the camera 16, a predetermined image is projected from the projector 13, and the state of the projection surface 11A on which the image has been projected from the projector 13 is photographed by the camera 16. On the basis of the image taken by the camera 16, parameters that are used in geometric correction in projecting content images are calculated.

Such parameter calculation is periodically performed with a predetermined period. Further, parameter calculation is performed at a predetermined timing such as when the position of the projector 13 is moved.

As described above, the plurality of cameras can permanently be installed at positions different from the position that the user watches, that is, positions at which the cameras do not disturb the user. Further, parameters for geometric correction can be calculated at any timing on the basis of images taken by the permanently installed cameras without adjusting the cameras each time.

Since taken images rotated depending on the tilts of the cameras are displayed as preview images, the administrator of the multi-projection system 1 can easily adjust the cameras.

Further, since information for guiding movement directions of the cameras are displayed, even a person who is not used to the adjustment can adjust the cameras. Even in a case where the cameras have been moved due to disturbance, it is not necessary that a person who has expertise in adjusting the cameras comes to adjust the cameras each time, and hence, the operability can be enhanced.

<Modified Example>

The images each having the pattern using the marks in the predetermined colors are used as pattern images, but an image having a pattern using predetermined patterns such as a circle, a square, a triangle, and a cross may be used.

The pattern image is projected from the projector 13, but the above-mentioned processing may be performed on the basis of an image obtained by photographing markers set on the projection surface 11A.

In detailed adjustment, the administrator manually adjusts the camera, but the camera 16 may be automatically adjusted to the appropriate position and tilt detected on the basis of a pattern image. In such a case, a drive unit configured to adjust the position and tilt of the camera 16L and a drive unit configured to adjust the position and tilt of the camera 16R are each provided.

The above-mentioned series of processing processes can be executed by hardware or software. In a case where the series of processing processes are executed by software, a program that configures the software is installed from a program storage medium on a computer of FIG. 26 that configures the image processing device 21, for example.

For example, The program that is executed by the CPU 101 is provided by being recorded on the removable medium 115 or provided via a wired or wireless transmission medium, such as a local area network, the Internet, or digital broadcasting, and is installed on the HDD 114.

With regard to the program that the computer executes, the processing processes of the program may be performed in chronological order in the order described herein or in parallel. Alternatively, the processing processes of the program may be performed at a right timing, for example, when the program is called.

Note that, herein, a "system" means an aggregation of a plurality of components (device, module (part), or the like), and it does not matter whether or not all the components are in the same cabinet. Thus, a plurality of devices that is accommodated in separate cabinets and connected to each other via a network, and one device including a plurality of modules accommodated in one cabinet are both "systems."

The effects described herein are merely exemplary and are not limited, and other effects may be provided.

The embodiment of the present technology is not limited to the embodiment described above, and various modifications can be made without departing from the gist of the present technology.

For example, the present technology can employ the configuration of cloud computing in which a plurality of devices shares one function via a network to process the function in cooperation.

Further, each step described in the above-mentioned flowcharts can be executed by being shared in a plurality of devices as well as being executed by one device.

Moreover, in a case where a plurality of processing processes is included in one step, the plurality of processing processes included in the one step can be executed by being shared in a plurality of devices as well as being executed by one device.

The present technology can also take the following configurations.

(1)

An image processing device including:

an estimation unit configured to estimate, on the basis of a taken image taken by a camera installed at a predetermined tilt, the tilt of the camera, the camera being configured to photograph a projection surface of a screen on which a pattern image that includes an image having a predetermined pattern has been projected from a projector; and a display controlling unit configured to perform control to display the taken image rotated depending on the tilt of the camera.

(2)

The image processing device according to Item (1), in which the display controlling unit rotates the taken image such that a movement direction in which the camera is moved in real space matches a switching direction of a display range of the taken image.

(3)

The image processing device according to Item (1) or (2), in which the screen includes a dome screen.

(4)

The image processing device according to Item (3), in which the camera is installed on each of left and right of the screen.

(5)

The image processing device according to Item (4), further including:

a generation unit configured to generate the pattern image having predetermined marks put at a lower left corner and a lower right corner of the pattern image; and a projection controlling unit configured to control each of a plurality of the projectors to project the pattern image.

(6)

The image processing device according to Item (5), in which two of the projectors are installed on the left and right of the screen at predetermined tilts.

(7)

The image processing device according to Item (6), in which the two projectors are each installed such that a horizontal side of the pattern image is projected on the projection surface as an arc.

(8)

The image processing device according to any one of Items (5) to (7), in which, light of the pattern image projected from the projector includes light of the marks that is emitted on positions on the projection surface and light of an upper left corner and an upper right corner of the pattern image that is emitted on positions outside the projection surface.

(9)

The image processing device according to any one of Items (6) to (8), further including:

a detection unit configured to detect, on the basis of each of the taken images taken by two of the cameras, an overlapping region included in the pattern image projected on the projection surface from each of the two projectors and an edge portion of the screen.

(10)

The image processing device according to Item (9), in which the display controlling unit performs, on the basis of positions of the overlapping region of the taken image and the edge portion, control to display information for guiding a movement direction of the camera together with the taken image.

(11)

The image processing device according to Item (9) or (10), in which the display controlling unit performs, in a case where the overlapping region and the edge portion appear in each of the taken images taken by the two cameras, control to display information indicating that the cameras are at appropriate positions and tilts.

(12)

An image processing method including controlling an image processing device to:

estimate, on the basis of a taken image taken by a camera installed at a predetermined tilt, the tilt of the camera, the camera being configured to photograph a projection surface of a screen on which a pattern image that includes an image having a predetermined pattern has been projected from a projector; and perform control to display the taken image rotated depending on the tilt of the camera.

(13)

A program for causing a computer to execute the processing of:

estimating, on the basis of a taken image taken by a camera installed at a predetermined tilt, the tilt of the camera, the camera being configured to photograph a projection surface of a screen on which a pattern image that includes an image having a predetermined pattern has been projected from a projector; and performing control to display the taken image rotated depending on the tilt of the camera.

(14)

A projection system including:

a dome screen;

a projector installed at a predetermined tilt and configured to project a pattern image that includes an image having a predetermined pattern on the screen;

a camera installed at a predetermined tilt together with the projector; and an image processing device including an estimation unit configured to estimate the tilt of the camera on the basis of a taken image obtained by photographing, by the camera, a projection surface of the screen on which the pattern image has been projected from the projector, and a display controlling unit configured to perform control to display the taken image rotated depending on the tilt of the camera.

REFERENCE SIGNS LIST

1 Multi-projection system, 11 Dome screen, 11A Projection surface, 13L, 13R Projector, 14 Surround speaker, 15 Woofer, 16L, 16R Camera, 21 Image processing device, 131 Information processing unit, 151 Pattern image generating unit, 152 Projection controlling unit, 153 Pattern detecting unit, 154 Screen edge detecting unit, 155 Display controlling unit

The invention claimed is:

1. An image processing device, comprising:
a processor configured to:
acquire a first taken image from a first camera, wherein the first camera captures a projection surface of a screen on which a first pattern image that includes a first pattern is projected from a first projector;
acquire a second taken image from a second camera, wherein the second camera captures the projection surface of the screen on which a second pattern image that includes a second pattern is projected from a second projector;
detect a plurality of marks put at a lower left corner and a lower right corner of each of the first pattern image and the second pattern image, wherein the plurality of marks is detected based on an analysis of each of the first taken image and the second taken image;
detect, based on each of the first taken image and the second taken image, an overlapping region and an edge portion of the screen, wherein the overlapping region is a region of overlap of the first pattern image and the second pattern image;
estimate a tilt of each of the first camera and the second camera based on a position of each mark of the plurality of marks;
rotate each of the first taken image and the second taken image based on the estimated tilt of the first camera and the second camera, respectively;
control the screen to display the rotated first taken image and the rotated second taken image; and
control, based on positions of the overlapping region and the edge portion, the screen to display information to guide a movement direction of the first camera and the second camera with the first taken image and the second taken image.

2. The image processing device according to claim 1, wherein the processor is further configured to:
rotate the first taken image such that a movement direction in which the first camera is moved in real space matches a switching direction of a display range of the first taken image; and
rotate the second taken image such that a movement direction in which the second camera is moved in the real space matches a switching direction of a display range of the second taken image.

3. The image processing device according to claim 1, wherein the screen includes a dome screen.

4. The image processing device according to claim 3, wherein the first camera is installed on left of the screen and the second camera is installed on right of the screen.

5. The image processing device according to claim 4, wherein the processor is further configured to:
generate the first pattern image and the second pattern image having the plurality of marks put at the lower left corner and the lower right corner of the first pattern image and the second pattern image; and
control each of the first projector and the second projector to project the first pattern image and the second pattern image, respectively.

6. The image processing device according to claim 5, wherein
the first projector is installed on a left side of the screen at a first tilt, and
the second projector is installed on a right side of the screen at a second tilt.

7. The image processing device according to claim 6, wherein the first projector and the second projector are installed such that a horizontal side of the first pattern image and the second pattern image are projected on the projection surface as an arc.

8. The image processing device according to claim 5, wherein light of the first pattern image includes light of the plurality of marks that is emitted on positions on the projection surface and light of an upper left corner and an upper right corner of the first pattern image that is emitted on positions outside the projection surface.

9. The image processing device according to claim 1, wherein the processor is further configured to control, in a case where the overlapping region and the edge portion appear in each of the first taken image and the second taken image, the screen to display information indicating that the first camera and the second camera are at appropriate positions and tilts.

10. An image processing method, comprising:
acquiring a first taken image from a first camera, wherein the first camera captures a projection surface of a screen on which a first pattern image that includes a first pattern is projected from a first projector;
acquiring a second taken image from a second camera, wherein the second camera captures the projection surface of the screen on which a second pattern image that includes a second pattern is projected from a second projector;
detecting a plurality of marks put at a lower left corner and a lower right corner of each of the first pattern image and the second pattern image, wherein the plurality of marks is detected based on an analysis of each of the first taken image and the second taken image;
detecting, based on each of the first taken image and the second taken image, an overlapping region and an edge portion of the screen, wherein the overlapping region is a region of overlap of the first pattern image and the second pattern image;
estimating a tilt of each of the first camera and the second camera based on a position of each mark of the plurality of marks;
rotating each of the first taken image and the second taken image based on the estimated tilt of the first camera and the second camera, respectively;
controlling the screen to display the rotated first taken image and the rotated second taken image; and
control, based on positions of the overlapping region and the edge portion, the screen to display information to guide a movement direction of the first camera and the second camera with the first taken image and the second taken image.

11. A non-transitory computer-readable medium having stored thereon, computer-executable instructions which, when executed by a computer, cause the computer to execute operations, the operations comprising:
acquiring a first taken image from a first camera, wherein the first camera captures a projection surface of a screen on which a first pattern image that includes a first pattern is projected from a first projector;
acquiring a second taken image from a second camera, wherein the second camera captures the projection surface of the screen on which a second pattern image that includes a second pattern is projected from a second projector;
detecting a plurality of marks put at a lower left corner and a lower right corner of each of the first pattern image and the second pattern image, wherein the plurality of marks is detected based on an analysis of each of the first taken image and the second taken image;
detecting, based on each of the first taken image and the second taken image, an overlapping region and an edge portion of the screen, wherein the overlapping region is a region of overlap of the first pattern image and the second pattern image;
estimating a tilt of each of the first camera and the second camera based on a position of each mark of the plurality of marks;
rotating each of the first taken image and the second taken image based on the estimated tilt of the first camera and the second camera, respectively;
controlling the screen to display the rotated first taken image and the rotated second taken image; and
controlling, based on positions of the overlapping region and the edge portion, the screen to display information to guide a movement direction of the first camera and the second camera with the first taken image and the second taken image.

12. A projection system, comprising:
   a dome screen;
   a first projector installed at a first tilt configured to project a first pattern image that includes a first pattern on the dome screen;
   a second projector installed at a second tilt configured to project a second pattern image that includes a second pattern on the dome screen;
   a first camera installed at the first tilt together with the first projector;
   a second camera installed at the second tilt together with the second projector; and
   an image processing device that includes a processor configured to:
      acquire a first taken image from the first camera, wherein the first camera is configured to capture a projection surface of the dome screen on which the first pattern image is projected;
      acquire a second taken image from the second camera, wherein the second camera is configured to capture the projection surface of the dome screen on which the second pattern image is projected;
      detect a plurality of marks put at a lower left corner and a lower right corner of each of the first pattern image and the second pattern image, wherein the plurality of marks is detected based on an analysis of each of the first taken image and the second taken image;
      detect, based on each of the first taken image and the second taken image, an overlapping region and an edge portion of the dome screen, wherein the overlapping region is a region of overlap of the first pattern image and the second pattern image;
      estimate the first tilt of the first camera and the second tilt of the second camera based on a position of each mark of the plurality of marks;
      rotate each of the first taken image and the second taken image based on the estimated first tilt and the estimated second tilt;
      control the dome screen to display the rotated first taken image and the rotated second taken image; and
      control, based on positions of the overlapping region and the edge portion, the dome screen to display information to guide a movement direction of the first camera and the second camera with the first taken image and the second taken image.

* * * * *